US011231608B2

(12) United States Patent
Oton et al.

(10) Patent No.: US 11,231,608 B2
(45) Date of Patent: Jan. 25, 2022

(54) OPTICAL COMPONENT COMPRISING LIQUID CRYSTALS IN A BLUE PHASE AND PROCESS FOR MAKING SUCH OPTICAL COMPONENT

(71) Applicants: NIKON CORPORATION, Minato-ku (JP); Essilor International, Charenton-le-Pont (FR)

(72) Inventors: Eva Oton, Kawasaki (JP); Fuyuhiko Inoue, Minato-ku (JP); Toshiki Nakano, Minato-ku (JP); Estelle Netter, Charenton-le-Pont (FR); Yukiko Katayama, Minato-ku (JP)

(73) Assignees: NIKON CORPORATION, Minato-ku (JP); Essilor International, Charenton-le-Pont (FR)

( * ) Notice: Subject to any disclaimer, the term of this patent is extended or adjusted under 35 U.S.C. 154(b) by 90 days.

(21) Appl. No.: 16/341,992

(22) PCT Filed: Nov. 18, 2016

(86) PCT No.: PCT/IB2016/001993
§ 371 (c)(1),
(2) Date: Apr. 15, 2019

(87) PCT Pub. No.: WO2018/091940
PCT Pub. Date: May 24, 2018

(65) Prior Publication Data
US 2019/0250438 A1 Aug. 15, 2019

(51) Int. Cl.
*G02F 1/1334* (2006.01)
*G02F 1/137* (2006.01)
(Continued)

(52) U.S. Cl.
CPC ........ *G02F 1/1334* (2013.01); *C09K 19/0275* (2013.01); *G02F 1/137* (2013.01);
(Continued)

(58) Field of Classification Search
CPC ........................ C09K 19/0275; G02F 1/13793
See application file for complete search history.

(56) References Cited

U.S. PATENT DOCUMENTS

2006/0227283 A1  10/2006  Ooi
2010/0315585 A1* 12/2010  Chien ................. G02F 1/13718
  349/201
(Continued)

FOREIGN PATENT DOCUMENTS

CN        1886691 A    12/2006
CN     102597862 A    7/2012
(Continued)

OTHER PUBLICATIONS

Wu et al., "Dielectric characterization and voltage holding ratio of blue-phase cells", Nov. 27, 2015, Displays, 44, 66-72. (Year: 2015).*

(Continued)

*Primary Examiner* — Chanceity N Robinson
*Assistant Examiner* — Anna Malloy
(74) *Attorney, Agent, or Firm* — Oblon, McClelland, Maier & Neustadt, L.L.P.

(57) ABSTRACT

An optical component including a first layer, a second layer and a bulk sandwiched between the first and second layers, where the bulk is formed by a composition containing a liquid crystal material which is in a blue phase. At least one of the first and second layers has, toward the bulk, an alignment layer. The blue phase of the liquid crystal material exhibits a uniform organization in three directions (Ox, Oy, Oz) in at least 80% of the volume of the bulk, the liquid (Continued)

crystal material being stabilized in the blue phase at least over the temperatures ranging from 10° C. to 35° C.

8 Claims, 7 Drawing Sheets

(51) Int. Cl.
    *C09K 19/02*     (2006.01)
    *G02F 1/1335*     (2006.01)
    *G02F 1/1337*     (2006.01)
    *G02F 1/139*     (2006.01)

(52) U.S. Cl.
    CPC .......... *G02F 1/1337* (2013.01); *G02F 1/1393* (2013.01); *G02F 1/13793* (2021.01); *G02F 1/133528* (2013.01)

(56) References Cited

U.S. PATENT DOCUMENTS

| | | |
|---|---|---|
| 2011/0261306 A1 | 10/2011 | Tsai et al. |
| 2012/0057086 A1* | 3/2012 | Kizaki ............... C09K 19/0275 349/13 |
| 2012/0307184 A1* | 12/2012 | Kizaki .................. C09K 19/38 349/88 |
| 2013/0021546 A1 | 1/2013 | Kikuchi et al. |
| 2015/0185512 A1 | 7/2015 | Kikuchi et al. |

FOREIGN PATENT DOCUMENTS

| | | |
|---|---|---|
| JP | 2005-189434 A | 7/2005 |
| JP | 2007-308534 A | 11/2007 |
| JP | 2011-203546 A | 10/2011 |
| WO | WO 2005/080529 A1 | 9/2005 |

OTHER PUBLICATIONS

Kawata et al., "Anisotropy of the electro-optic Kerr effect in polymer-stabilized blue phases", Feb. 27, 2015, Physical Review E, 91, 022503-1 to 022503-6. (Year: 2015).*
Chen et al., "Influence of alignment layers on crystal growth of polymer-stabilized blue phase liquid crystals", Apr. 1, 2016, Optical Materials Express, vol. 6 No. 4, 1003-1010. (Year: 2016).*
International Search Report dated May 17, 2017 in PCT/IB2016/001993 filed Nov. 18, 2016.
Japanese Office Action dated Jan. 12, 2021 in Japanese Patent Application No. 2019-527181 (with English translation), 11 pages.
Office Action dated Jun. 9, 2021 in Chinese Patent Application No. 201680090864.4 (with partial English-language Translation), 7 pages.

* cited by examiner

Fig.7  2μm   Fig.9  4μm   Fig.11  10μm
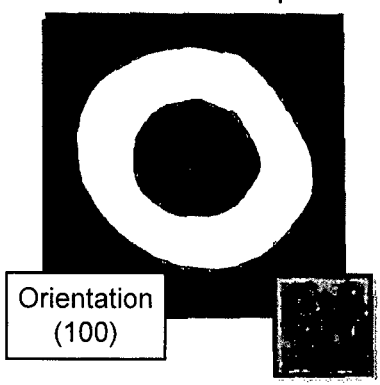
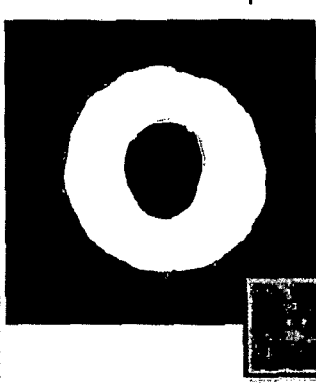
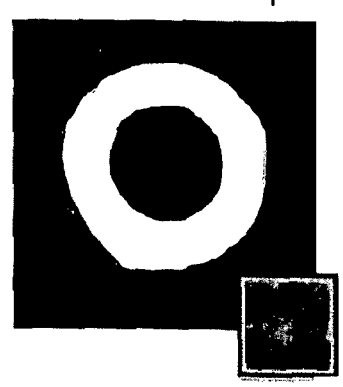
Orientation (100)
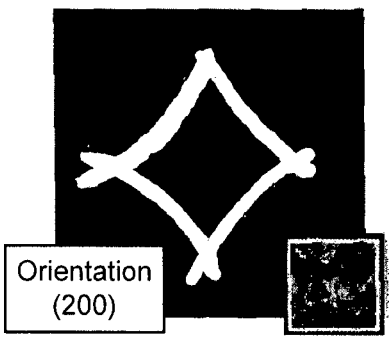
Orientation (200)
Fig.8   Fig.10   Fig.12
Fig.13
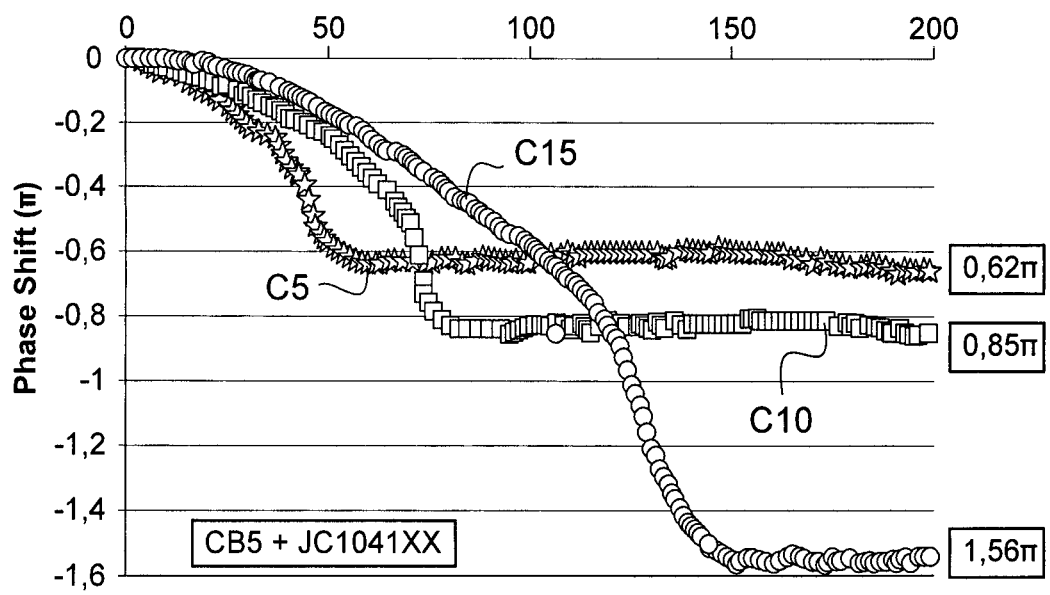

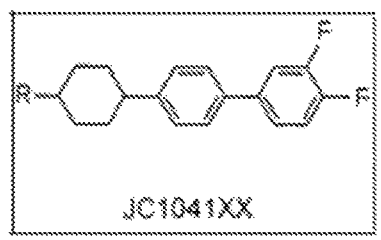
Fig.16
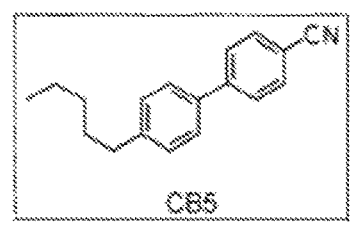
Fig.17
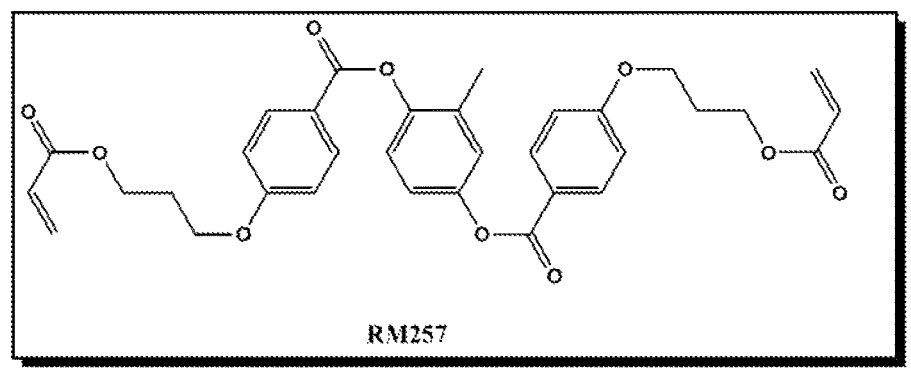
Fig. 18
Fig. 19
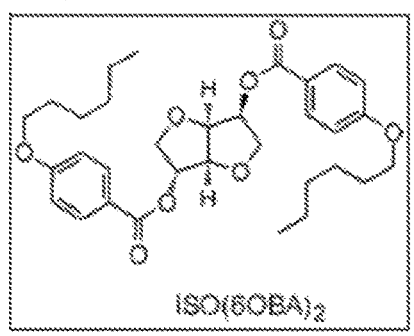
Fig.20
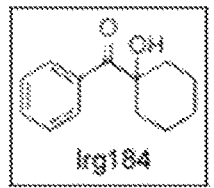
Fig.21

OPTICAL COMPONENT COMPRISING LIQUID CRYSTALS IN A BLUE PHASE AND PROCESS FOR MAKING SUCH OPTICAL COMPONENT

TECHNICAL FIELD OF THE INVENTION

The invention relates to an optical article comprising liquid crystal molecules in blue phase.

More precisely the invention relates to an optical component comprising a first layer, a second layer and a bulk sandwiched between said first and second layers, wherein the bulk is formed by a composition comprising a liquid crystal material which is in a blue phase.

The invention also relates to a process for making such an optical article.

BACKGROUND INFORMATION AND PRIOR ART

It is well known that liquid crystals can form blue phases that consist in an arrangement of liquid crystal molecules into double twist cylinders assembled into three dimensional cubic lattice structures.

In particular, liquid crystal molecules can organize relative to each other to form a blue phase I structure or a blue phase II structure.

The blue phase I structure consists in an assembly of the double twist cylinders in cubic lattice such that disclination lines between the cylinders, which are defect lines in which rotational symmetry is violated, are in body-centered cubic symmetry. The blue phase II structure consists in an assembly of the double twist cylinders in cubic lattice such that disclination lines between the cylinders are in simple cubic symmetry.

One feature of liquid crystal materials in blue phase, that is to say materials comprising liquid crystal molecules organized in blue phases, is their response time to electric fields as such induced between two electrodes when a voltage is applied. In general, such response time is approximately of less than a millisecond. Another feature of liquid crystal materials in blue phase is their optical isotropy under usual ambient conditions of electromagnetic field.

These two features allow using the liquid crystal materials in blue phase in devices working as polarization independent phase modulators. Usually, such devices comprise a liquid crystal material in blue phase sandwiched between two electrodes, said electrodes being adapted to create an electric field through the liquid crystal material. In response to the electric field, the effective refractive index of said liquid crystal material changes and the phase of any light beam entering the device may thus be shifted.

However, the physical states, named blue phases, of the liquid crystal molecules of the material are rather unstable as they naturally exist over small ranges of temperatures only, usually over a few Celsius degrees only.

Furthermore, today, high voltages need to be applied between the two electrodes of the device to increase the refractive index range that the liquid crystal material may reach, or to increase the phase modulation of any light beam entering such device. Such high voltages might damage the liquid crystal material or the device as a whole. In addition, the devices needed to apply high voltages are rather costly and have a large environmental footprint. Moreover, if the electronics that provide such high voltages are embedded in the device itself, no leakage current is allowed for safety reasons.

SUMMARY OF THE INVENTION

Therefore one object of the invention is to provide a device working as a polarization independent phase modulator using a liquid crystal material in blue phase, that has easily reachable conditions of use and that exhibits an improved electro-optical behavior.

Such optical component comprises a first layer, a second layer and a bulk sandwiched between said first and second layers, and is such that
- the bulk is formed by a composition comprising a liquid crystal material which is in a blue phase,
- at least one of the first and second layers has, toward the bulk, an alignment layer, and
- the blue phase of the liquid crystal material is a first type of structure called blue phase I, and exhibits a uniform organization in three directions in at least 80% of the volume of the bulk, said liquid crystal material in said blue phase being stabilized at least over the temperatures ranging from 20° C. to 35° C.

Preferably, the stabilization of the blue phase enables the blue phase to be stable in a range of temperature going from 15° C. to 35° C. or even from 10° C. to 35° C. or even 40° C.

Thus, advantageously, the optical component according to the invention has a homogeneous bulk, that is to say extremely well ordered blue phase structures within the liquid crystal material, on a large size area.

Moreover, the optical component is stable at room temperature and is thus easier to use in standard conditions of temperature.

In addition, the optical component is able to induce at least a $1,5\pi$ phase shift modulation, or even a $2\pi$ phase shift modulation, with rather lower voltages than other known solutions.

In the rest of the description, "a homogeneous bulk" should be understood as a material in which the blue phase structures are organized in cubic lattices homogeneously ordered.

More precisely, each cubic lattice is a three dimensional structure that has six virtual faces and for which three axis Oz, Ox, Oy can be defined, each axis being perpendicular to a pair of virtual faces.

When the bulk is homogeneous, the cubic lattices have the same orientation, in all directions: each of the axis Oz, Ox, Oy of the cubic lattices is parallel to the axis Oz, Ox, Oy of the other cubic lattices, respectively.

Thus, when the bulk is homogeneous, the faces of one cubic lattice are two by two parallel to the faces of another cubic lattice.

In the present embodiments of the invention, the surfaces of the first and second layers that flank the bulk are parallel to each other.

The cubic lattices of the bulk are then oriented relative to said first and second layers.

More precisely, in a first preferred embodiment of the invention, each cubic lattice of the bulk is in a [1,1,0] or [2,2,0] crystallographic configuration or similar and thus presents a first axis (Oy) that is parallel to said first and second layers, and two other axis (Ox, Oz) forming an angle theta with the direction normal to said surfaces of the first and second layers.

In particular, said two other axis (Ox, Oz) form an angle theta of 45° with said normal direction.

In other words, in this first embodiment, four edges of each cubic lattice of the bulk are parallel to said surfaces of the first and second layers, none of the faces of said cubic lattice being parallel to said surfaces of the first and second layers.

In a second embodiment of the invention, each cubic lattice of the bulk is in [1,0,0] or [2,0,0] crystallographic configuration or similar and thus presents a first axis (Oz) that is perpendicular to both surfaces of said first and second layers, each of the two other axis (Ox, Oy) being parallel to said surfaces of the first and second layers.

In other words, in this second embodiment, eight edges of each cubic lattice are parallel to said surfaces of the first and second layers, two faces of said cubic lattice being parallel to said surfaces of the first and second layers.

Other characteristics of the optical component of this invention are the following:
- the liquid crystal material comprises liquid crystal molecules, that are arranged in blue phase structures comprising double twist cylinders disposed in a plurality of cubic lattices when said material is in a blue phase, said cubic lattices having virtual faces in the shape of a square being disposed such that any two adjacent cubic lattices exhibit virtual faces that are globally parallel in said three directions in at least 80% of the volume of the bulk;
- the alignment layer comprises polyimide;
- the composition comprises a matrix material distinct from the liquid crystal material, said liquid crystal material being stabilized in said blue phase by said matrix material in polymerized form;
- the liquid crystal material comprising a mix of main liquid crystal molecules and guest liquid crystal molecules, said composition comprises from 30% to 55%, in weight relative to the total weight of the liquid crystal material, of said guest liquid crystal molecules, and at least 45% of said main liquid crystal molecules;
- the guest liquid crystal molecules are CB5 or MLC2140 liquid crystal molecules mixtures and the main liquid crystal molecules are composed of the JC1041XX mixture;
- the matrix material comprising a first monomer 12CA and a second monomer RM257, said composition comprises, in weight relative to the total weight of the composition, at least 3.5%, preferably 5%, of said second monomer RM257 and, from 7% to 15%, of said first and second monomers 12CA, RM257 taken together;
- the composition comprises from 5% to 7% of a chiral dopant, such as $ISO(6OBA)_2$, adapted to induce said blue phase of said liquid crystal material;
- each first and second layer forms an electrode adapted to be connected to a power source, in order to place said liquid crystal material of the bulk into an electric field;
- it is a tunable phase modulator or even an optical lens equipped with a tunable phase modulator.
- it is a polarization independent tunable phase modulator.

Indeed, in case the article is a tunable phase modulator, the object of the invention enables said tunable phase modulator to have polarization independency. Indeed, in activated state, the liquid crystals are aligned and without polarization effect, and in non-activated state, at room temperature, the liquid crystal is in blue phase state which is also without polarization effect on the light transmitted through it.

A further object of the invention is to provide a process for making such an optical component.

Such process for making an optical component comprising a liquid crystal material stabilized in a blue phase comprises the steps of:

a) providing a first layer and a second layer, the first and second layers forming two main surfaces facing each other, at least one of the main surfaces having an alignment layer toward the other main surface, said alignment layer comprising polyimide;

b) filling up the space between said first and second layer with a composition comprising a mix of said liquid crystal material and of a matrix material distinct from the liquid crystal material, said liquid crystal material comprising liquid crystal molecules adapted to organize relative to each other to form a blue phase and said matrix material comprising monomers adapted to polymerize;

c) bringing the liquid crystal material into said blue phase by inducing the liquid crystal molecules to form blue phase structures;

d) polymerizing the monomers of the matrix material while the liquid crystal material is in said blue phase, the polymerization step d) being achieved at a polymerization temperature at which the liquid crystal material exhibits at least a first predetermined minimal proportion of the blue phase I first type of structure and at least a second predetermined minimal proportion of the blue phase II type of structure.

Advantageously, step d) of the process according to the invention provides a polymer network to the blue phase structures. The stability of said blue phase structures is thus extended to wide ranges of temperatures.

Advantageously, step a) of the process according to the invention imposes a uniform arrangement of the cubic lattices of the blue phase structures, contrarily to what was stated in the literature until now.

The process as a whole provides an optical component that has a homogeneous bulk, that is to say both an extremely well ordered blue phase within the liquid crystal material of the composition forming the bulk. Such properties are reached on a large size area of the bulk and over a wide range of temperatures, including ambient temperatures.

For instance, the homogeneous bulk of the stabilized blue phase may be reached on 2 $cm^2$ or more, such that 3 $cm^2$, 5 $cm^2$, 8 $cm^2$ or even 10 $cm^2$ or more, forming a homogeneous zone that covers at least 80% of the surface of the cell, on the whole thickness of the cell, for a range of temperatures comprised between 10° C. to 35° C. (Celsius degrees).

A typical manufactured cell is composed by two ITO coated glass substrates assembled into each other as a sandwich-like cell with a specific thickness between the substrates. The active area of the cell is 1 $cm^2$ by 2-15 μm thick.

Other characteristics of the process of this invention are the following:
- in step c), a fraction of the liquid crystal material is brought into a first type of structure called blue phase I, another fraction of this liquid material forming a second type of structure called blue phase II, and the polymerization step d) is achieved while the liquid crystal material partly form this first type of structure called blue phase I and partly forms this second type of structure called blue phase II;
- the polymerization temperature is reached according to the following steps:

m) the temperature of the liquid crystal material is increased until all the liquid crystal molecules are organized relative to each other to form mostly a second type of structure called blue phase II;

n) the temperature of the liquid crystal material is lowered slowly until the blue phase I first type of structure represents said predetermined proportion of the liquid crystal material;

in step n), one of the actual proportion of the liquid crystal material in blue phase I, the orientation of the blue phase I, the alignment of the blue phase I, and the homogeneity of the blue phase I, is determined using a Kossel pattern;

in step n), the first predetermined minimal proportion is obtained when the blue phase I type of structure covers 40% of a surface of the liquid crystal material in blue phase in a plane parallel to said first and second layers and second predetermined minimal proportion is obtained when the blue phase II type of structure covers at least 20%, of said surface;

steps m) and n) are preceded by at least one cycle of raising the temperature until the liquid crystal material in blue phase is only in the blue phase II type of structure and then lowering the temperature until the liquid crystal material in blue phase is only in the blue phase I type of structure;

step d) consists in an UV-irradiation of the composition achieved with a light beam of power rate ranging from 0.1 mW/cm$^2$ to 1 mW/cm$^2$, for a duration ranging from 5 minutes to 2 hours;

in step b), the liquid crystal material comprising guest liquid crystal molecules, said composition comprises, in weight relative to the total weight of said liquid crystal material, from 30% to 55% of said guest liquid crystal molecules;

in step b), the liquid crystal material comprising main liquid crystal molecules, said composition comprises, in weight relative to the total weight of the liquid crystal material, at least 45% of said main liquid crystal molecules;

the guest liquid crystal molecules are CB5 or MLC2140 liquid crystal molecules mixtures;

the liquid crystal material comprising main liquid crystal molecules and the matrix material comprising a first and a second monomer, said composition comprises, in weight relative to the total weight of said composition, from 7% to 15% of said first and second monomers taken together, and from 5% to 7% of a chiral dopant;

said main liquid crystal molecules are JC1041XX, and/or one or both of the two monomers is chosen in the list consisting in 12CA and RM257, and/or the chiral dopant is ISO(6OBA)$_2$;

in step a), each alignment layer is formed by a rubbed polyimide layer.

DETAILED DESCRIPTION OF EXAMPLE(S)

The following description, enriched with joint drawings that should be taken as non limitative examples, will help understand the invention and figure out how it can be realized.

On joint drawings:

FIG. 7 is a schematic representation of a Kossel pattern obtained from a liquid crystal material in blue phase II type of structure, in crystallographic configuration [1,0,0], in a cell of 2 µm thick;

FIG. 8 is a schematic representation of a Kossel pattern obtained from the optical component of the second embodiment of the invention, with a blue phase I type of structure in crystallographic configuration [2,0,0], in a cell of 2 µm thick;

FIG. 9 is a schematic representation of a Kossel pattern obtained from a liquid crystal material in blue phase II type of structure, in crystallographic configuration [1,0,0], in a cell of 4 µm thick;

FIG. 10 is a schematic representation of a Kossel pattern obtained from the optical component of the second embodiment of the invention, with a blue phase I type of structure in crystallographic configuration [2,0,0], in a cell of 4 µm thick;

FIG. 11 is a schematic representation of a Kossel pattern obtained from a liquid crystal material in blue phase II type of structure, in crystallographic configuration [1,0,0], in a cell of 10 µm thick;

Figure 14:
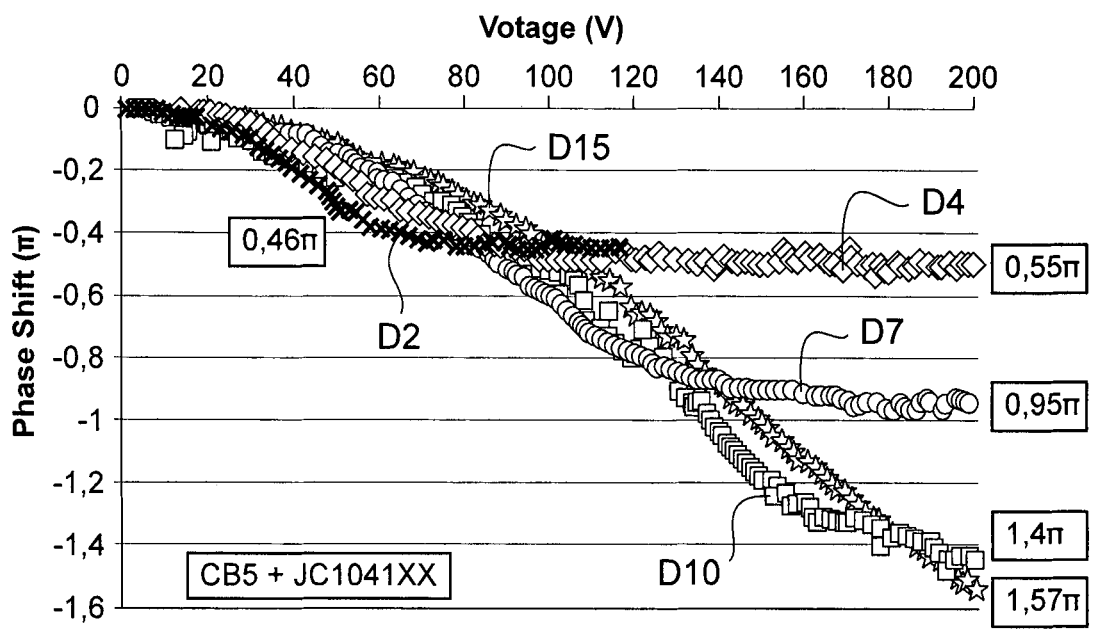
Figure 15:
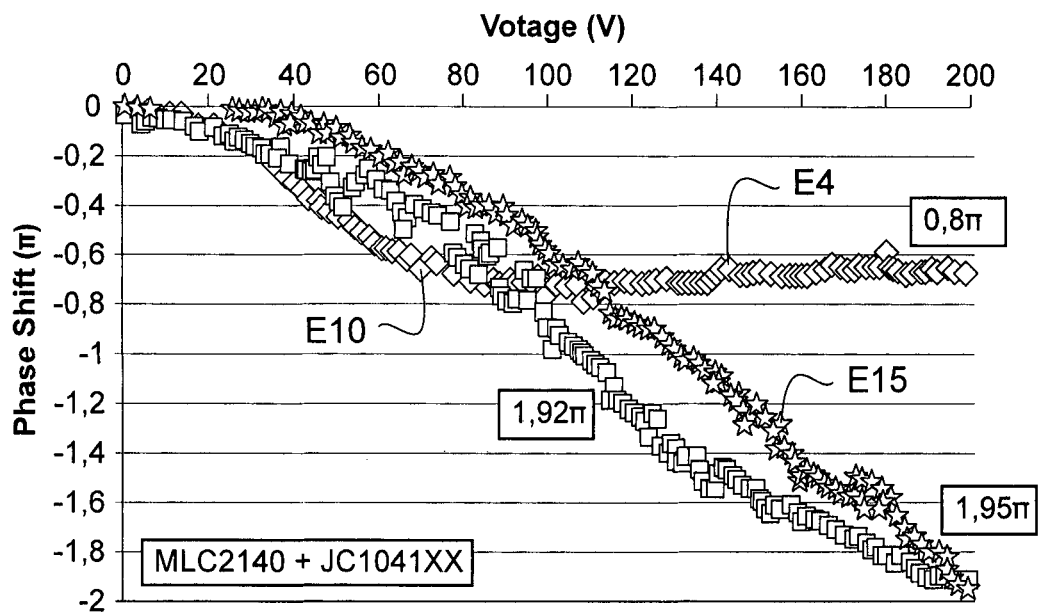
Figure 24:
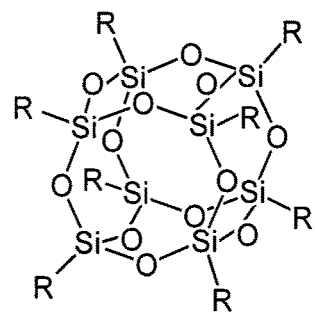
Figure 25:
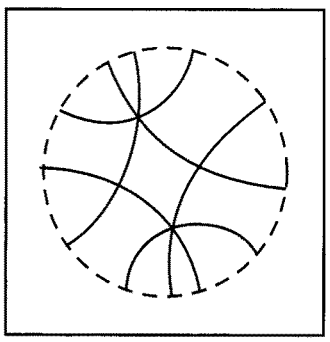
Figure 26:
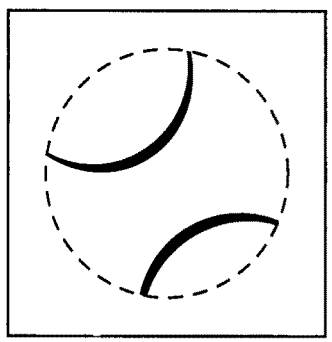
Figure 27:
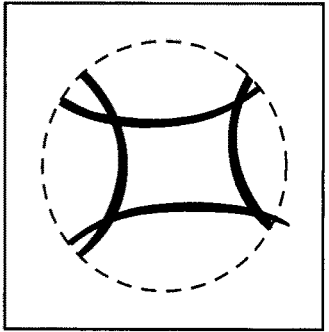
Figure 28:
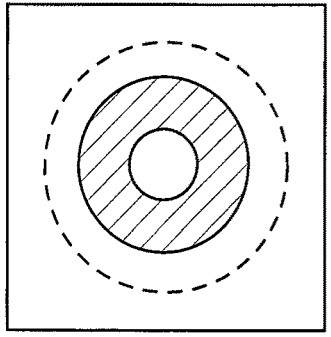

FIG. 12 a schematic representation of a Kossel pattern obtained from the optical component of the second embodiment of the invention, with a blue phase I type of structure in crystallographic configuration [2,0,0], in a cell of 10 µm thick;

FIG. 13 is a graph representing the phase shift in $\pi$ unit as a function of the voltage in volts (V) for a thickness of the bulk of 5 µm (C5), 10 µm (C10) and 15 µm (C15), for a composition of the bulk comprising CB5 and JC1041XX liquid crystal molecules, with no alignment layer on the substrates of the optical component (control cells);

FIG. 14 is a graph representing the phase shift in $\pi$ unit as a function of the voltage in volts (V) for a thickness of the bulk of 2 µm (D2), 4 µm (D4), 7 µm (D7), 10 µm (D10) and 15 µm (D15), for a composition of the bulk comprising CB5 and JC1041XX liquid crystal molecules in an optical component according to the invention and comprising two alignment layers of rubbed polyimide;

FIG. 15 is a graph representing the phase shift in $\pi$ unit as a function of the voltage in volts (V) for a thickness of the bulk of 4 µm (E4), 10 µm (E10) and 15 µm (E15), for a composition of the bulk comprising MLC2140 and JC1041XX liquid crystal molecules in an optical component according to the invention and comprising two alignment layers of rubbed polyimide;

FIGS. 16 to 23 show the developed formulas of molecules that may be used in embodiments of the invention;

FIG. 24 show the developed formula of a surfactant tested, and,

FIGS. 25 and 26 show schematic representations of the Kossel pattern obtained from an optical component of the first embodiment of the invention in crystallographic configuration [1,1,0] with the blue phase I type of structure (FIG. 25) and the blue phase II type of structure (FIG. 26), and, FIGS. 27 and 28 show schematic representations of the Kossel pattern obtained from an optical component of the second embodiment of the invention in crystallographic configuration [2,0,0] with the blue phase I type of structure (FIG. 27) and in crystallographic configuration [1,0,0] with the blue phase II type of structure (FIG. 28)

Figure 29:
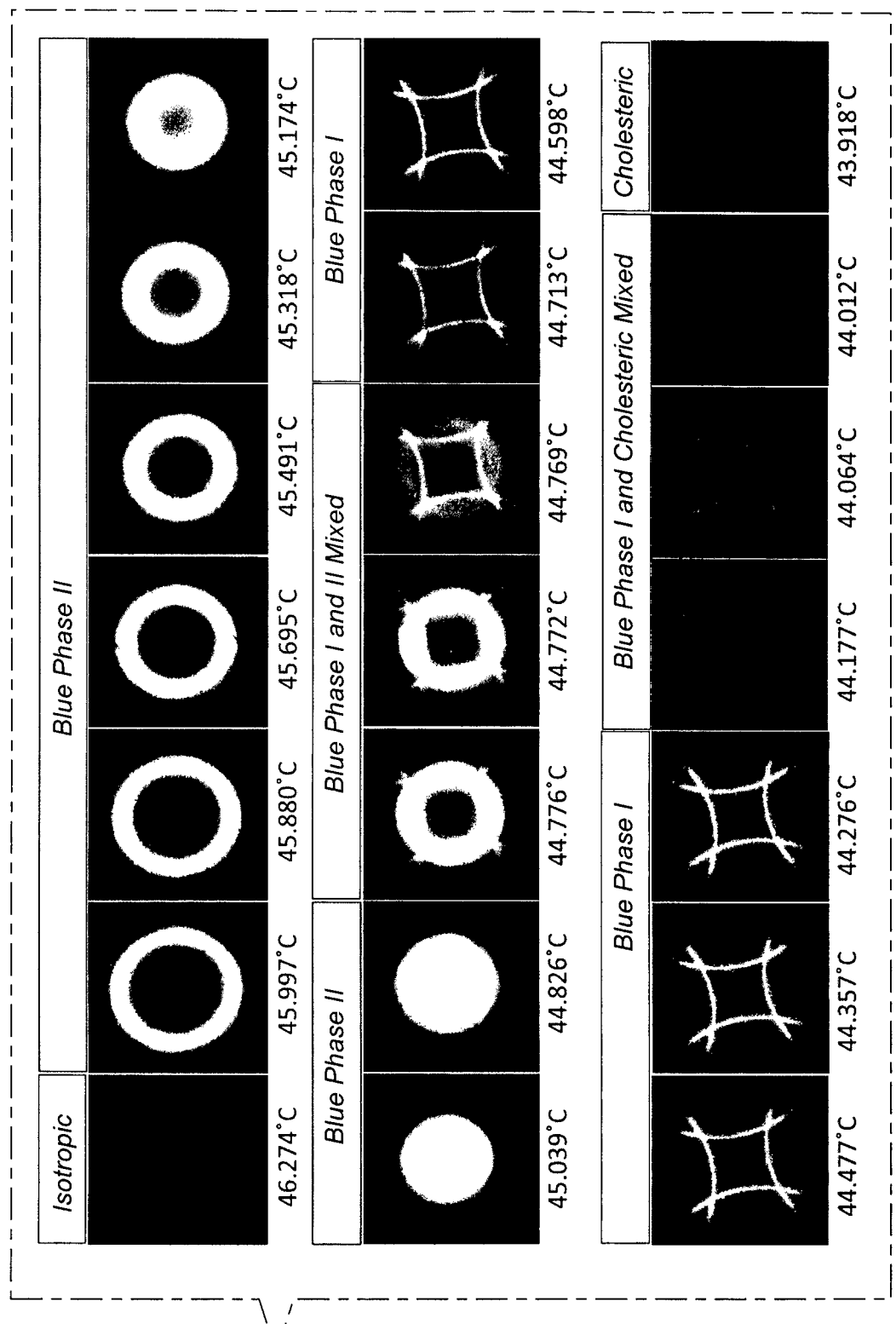

FIG. 29 shows the Kossel patterns observed during a calibration thermal cycle of the cell at different temperatures.

DEVICE

Figure 1:
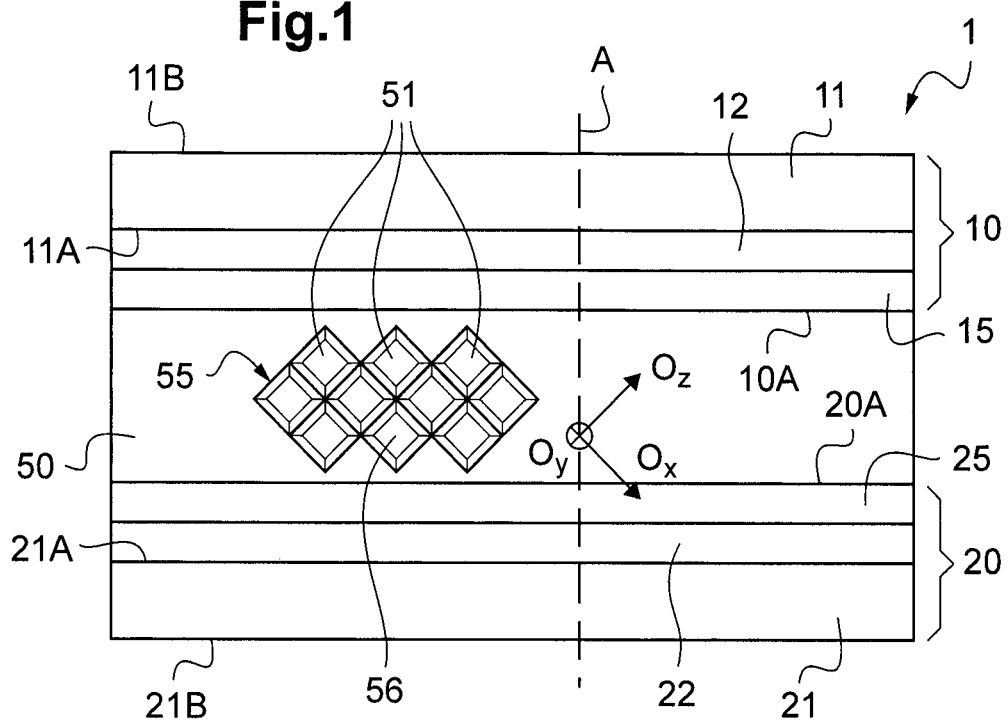
FIG. 1 is a schematic view of a first embodiment of the optical component according to the invention.
Figure 2:
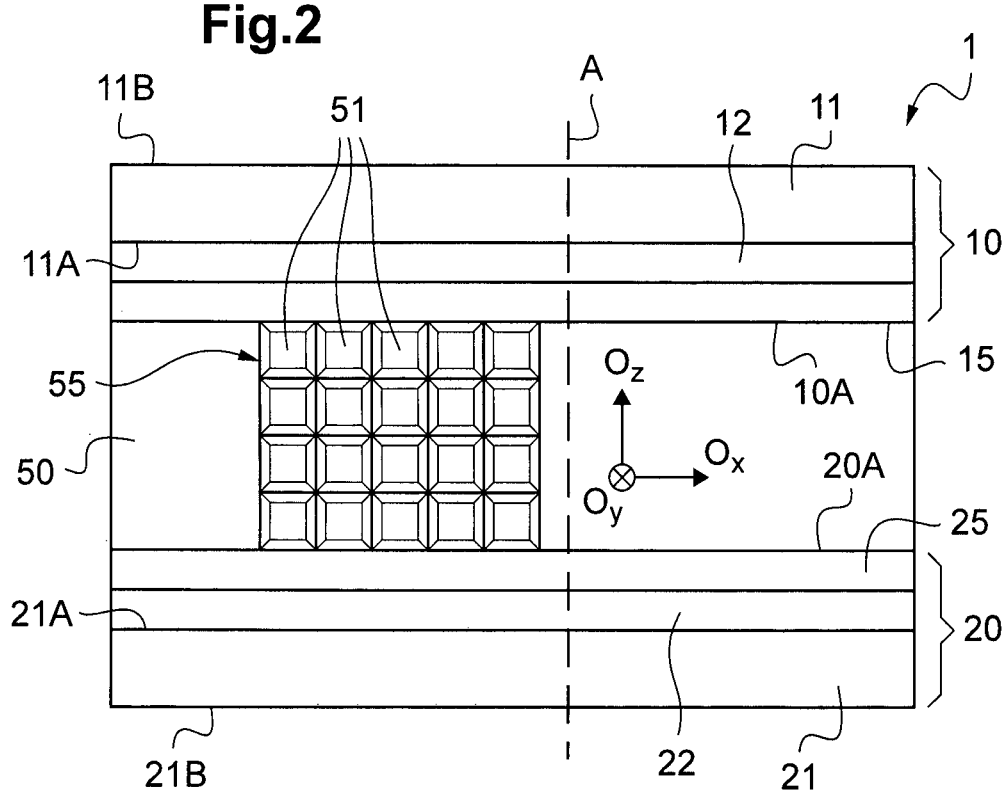
FIG. 2 is a schematic view of a second embodiment of the optical component according to the invention.

On FIGS. 1 and 2 are shown schematic crossed views of two embodiments of an optical component 1 according to the invention, comprising a first layer 10, a second layer 20 and a bulk 50 sandwiched between said first and second layers 10, 20, said bulk 50 comprising a liquid crystal material 55.

The only difference between these two embodiments is on the orientation of the cubic lattices 51 of the bulk 50 relative to the surfaces of the first and second layers. The signs of reference used for both embodiments are thus the same.

In such optical component 1 according to the invention, each first and second layer 10, 20 forms an electrode adapted to be connected to a power source, in order to place said liquid crystal material of the bulk 50 into an electric field.

As it will be explained later, the liquid crystal material 55 is adapted to switch when an electric field is applied between first and second electrodes placed around this liquid crystal material.

The optical component 1 according to the invention can thus be an optical lens with a tunable phase modulator, or used as a spatial phase modulator for instance.

More precisely, in the optical component 1 according to the invention,
- the bulk 50 is formed by a composition comprising the liquid crystal material 55 which is in a blue phase,
- at least one of the first and second layers 10, 20 has, toward the bulk, an alignment layer 15, 25, and
- the blue phase of the liquid crystal material 55 exhibits a uniform organization in three directions Ox, Oy, Oz in at least 80% of the volume of the bulk, said liquid crystal material 55 in said blue phase being stabilized at least over the temperatures ranging from 10° C. to 35° C.

Moreover, the blue phase of the liquid crystal material is in a first type of structure called blue phase I, that will be described later.

In practice, each first and second layer 10, 20 is a stack of sublayers.

Here each first and second layer 10, 20 comprises a substrate 11, 21, in the form of a plate having two main surfaces 11A, 11B, 21A, 21B that are plane and parallel.

The substrate 11, 21 forms a first sublayer of each first and second layer 10, 20.

One main surface 11A of the substrate 11 of the first layer 10 is facing one main surface 21A of the substrate 21 of the second layer 20.

The main surface 11A, 21A of each substrate 11, 21, facing each other, is covered by a coating of conductive material. This material forms an electrode 12, 22 on each substrate 11, 21.

In other words, the main surface 11A, 21A of each substrate 11, 22 that faces the inside of the optical component 1, that is to say the main surface 11A, 21A of each substrate 11, 21 that is placed toward the bulk 50, comprises the coating forming the corresponding electrode 12, 22.

This coating forms a second sublayer of the first and second layers 10, 20.

The substrate 11, 21 is for instance made of glass. The material forming the electrode 12, 22 is for instance Indium-Tin-Oxide (ITO).

Moreover, one or both of the first and second layers 10, 20 have an alignment layer 15, 25.

Here, as represented on FIGS. 1 and 2, the first and second layers 10, 20 both have an alignment layer 15, 25.

Each alignment layer 15, 25 forms a third sublayer of the first and second layers 10, 20.

More precisely, the alignment layer 15, 25 is placed over the coating forming the electrode 12, 22.

Thus, the alignment layer 15, 25 here covers said ITO coating 12, 22 and is in contact with the bulk 50.

In practice, the alignment layer 15, 25 comprises polyimide, preferably rubbed polyimide, defining an alignment direction along the direction of rubbing.

Here, the alignment layers 15, 25 have a relative orientation such that the privileged directions of these alignment layers are in an antiparallel configuration to each other. This means that the rubbing directions of the two alignment layers are parallel to each other, with opposite ways.

The rubbed polyimide layer has for example a thickness that ranges from 10 nanometers (nm) to 80 nanometers (nm), preferably of 20 nm.

Advantageously, the alignment layer 15, 25 plays a key role in the stabilization of the liquid crystal material in blue phase. Moreover, such alignment layer 15, 25 comprising rubbed polyimide improves the homogeneity of the organization of the liquid crystal material 55 within the bulk 50, independently of the liquid crystal molecules comprised in said liquid crystal material 55 when compared to other tested alignment layers, as will be explained later.

In practice, the bulk 50 is here formed by the composition comprising said liquid crystal material 55 and a matrix material distinct from the liquid crystal material 55.

The bulk 50 is transparent, that is to say that the transmission of light emitted by illuminant D65 is measured, as a mean, to be above 80% for the 380 nm to 780 nm wavelength range.

Advantageously, the optical component 1 according to the invention is also transparent, the bulk 50 and the first and second layers 10, 20 all being transparent.

When it is not stabilized, the liquid crystal material 55 can adopt different mesophases, as explained hereafter, depending on various external parameters such as composition and temperature.

According to the invention, as described later, the matrix material is in polymerized form in the bulk 50 of the optical component 1, in order to stabilize said liquid crystal material 55 in one of its mesophases named blue phase.

More precisely, the liquid crystal material 55 comprises liquid crystal molecules that exhibit various orientational and positional orders in said liquid crystal material 55, depending mainly on temperature, and the composition of said liquid crystal material.

The liquid crystal molecules are responsible for the liquid-crystalline properties of the liquid crystal material 55, that is, the fact that the liquid crystal material 55 may be organized in various liquid-crystal mesophases.

The liquid-crystal mesophases are phases occurring over a definite range of temperature, pressure, or composition within the mesomorphic states, that is to say, the states of matter in which the degree of molecular order is intermediate between the perfect three-dimensional, long-range positional and orientational order found in solid crystals and the absence of long-range order found in isotropic liquids, gases, and amorphous solids.

More precisely, the liquid-crystal mesophases are mesomorphic states having long-range orientational order.

The orientational and positional orders of the liquid crystal molecules here allow the liquid crystal material 55 to exhibit different kinds of structural phases, also called "mesophases", among which:
- an isotropic phase, which is a un-ordered phase in which the liquid crystal molecules does not exhibit long-range orientational order without any positional order,
- a nematic phase or a cholesteric phase, which is an ordered phase in which the liquid crystal molecules exhibit long-range orientational order without any positional order,
- the blue phase 56 in which the liquid crystal molecules have a particular constrained arrangement into double twist cylinders assembled into a plurality of three dimensional cubic lattices 51.

Further, whatever the phase, the liquid crystals may enter an electromagnetically oriented state in which the liquid crystal molecules exhibit long-range orientational order without any positional order with an orientation imposed by the electromagnetic field.

Whereas the nematic phase or cholesteric phase and blue phase 56 may be observed under ambient conditions of electromagnetic field, the electromagnetically oriented state is only observed when the liquid crystal material 55 is subject to an additional electromagnetic field, other than the ambient electromagnetic field, that forces the liquid crystal molecules to align along a given direction. The liquid crystal material 55 thus exhibits an electromagnetic orientation.

In practice, said cubic lattices 51 of the blue phase 56 of the liquid crystal material 55 are repeated structural units of the liquid crystal material organized in said blue phase that have virtual faces in the shape of a square organized as a cube.

More precisely, each cubic lattice 51 is a three dimensional structure that has six virtual faces and for which three axis Oz, Ox, Oy can be defined, each axis being perpendicular to a pair of virtual faces. In other words, for each cubic lattice an orthogonal referential can be defined formed by the three directions Ox, Oy, Oz.

In the optical component 1 of the invention, the cubic lattices 51 of the bulk 50 are disposed such that any two adjacent cubes exhibit virtual faces that are globally parallel in said three directions Ox, Oy, Oz, in at least 80% of the volume of the bulk 50.

Such a bulk 50 will be said to be homogeneous.

With this specific arrangement of the cubic lattices 51, the blue phase 56 of the liquid crystal material 55 is said to exhibit a uniform organization. In other words, when the bulk 50 is homogeneous, at least 80% of the volume of the bulk is formed by cubic lattices of blue phase having the same orientation, in all directions.

"Having the same orientation, in all directions" means that the faces of one cubic lattice are two by two parallel to the faces of another cubic lattice, that is to say that each of the axis Oz, Ox, Oy of the cubic lattices is parallel to the axis Oz, Ox, Oy of the other cubic lattices, respectively.

The cubic lattices 51 are then present, aligned and oriented homogeneously over at least 80% of the bulk 50.

The cubic lattices of the bulk 50 are said to be homogeneously aligned, when their referential (Ox, Oy, Oz) all presents the same inclination relative to an axis A perpendicular to the alignment layers (FIGS. 1 and 2). In practice, this is verified when they all are in the same crystallographic configuration. However, the cubic lattice with its referential (Ox, Oy, Oz) may still rotate around the axis A perpendicular to the alignment layers.

The cubic lattices are said to be homogeneously oriented, when they all have the same orientation relative to said axis A perpendicular to the alignment layers. The rotation around this axis is then blocked.

More precisely, in a first preferred embodiment of the invention shown on FIG. 1, the first and second layers that flank the bulk are parallel to each other and, for each cubic lattice of the bulk, one of the axis (Oy) is parallel to said surfaces of the first and second layers, each of the two other axis (Ox, Oz) forming an angle theta with the normal direction to the surfaces of said first and second layers.

In particular, said two other axis (Ox, Oz) form an angle theta of 45° with said normal.

In other words, in this first embodiment, four edges of the each cubic lattice are parallel to said first and second layers, none of the faces of said cubic lattice being parallel to said first and second layers.

In a second embodiment shown on FIG. 2, one of the axis (Oz) of the cubic lattice is perpendicular to both said first and second layers 10, 20, each of the two other axis (Ox, Oy) being parallel from one cubic lattice to another.

In this second embodiment, the two other axis (Ox, Oy) are parallel to said surfaces of the first and second alignment layers 15, 25 and the third axis (Oz) is orthogonal to these surfaces of the first and second layers, as represented on FIG. 2.

Moreover, in practice, regardless of the embodiment, the blue phase 56 of the liquid crystal material 55 may be found in two types of structures:
- a first type of structure called blue phase I that consists in an assembly of the double twist cylinders in cubic lattice such that disclination lines between the cylinders, which are defect lines in which rotational symmetry of the liquid crystal molecules assembly is violated, are in body-centered cubic symmetry, and
- a second type of structure called blue phase II that consists in an assembly of the double twist cylinders in cubic lattice such that disclination lines between the cylinders are in simple cubic symmetry.

In practice, the cubes of the blue phase I first type of structure have square faces of edges that range from 240 nanometers (nm) to 290 nanometers (nm), usually of 250 nm. The cubes of the blue phase II second type of structure have square faces of edges that range from 140 nanometers (nm) to 200 nanometers (nm), usually of 155 nm. Such first and second types of structures diffract optical light beams between 420 nm and 480 nm and, in particular, at 436 nm.

Alignment and orientation of the cubic lattices 51, as well as the type of blue phase (I or II) present may be checked thanks to the observation of the corresponding diffraction pattern called hereafter Kossel patterns.

The Kossel pattern is a diffraction pattern of the three dimensions repeated structural units of the liquid crystal material 55. Indeed, if convergent light enters a periodic structure of the bulk, a part of the incident light which meets the Bragg equation is reflected and produces specific patterns which depend on the orientation and size of the lattice and the type of the lattice.

The Kossel pattern can be observed by optical microscopy. The specific shape of the pattern gives information about the crystalline structure to determine the type of the blue phase: as already said, the blue phase I has a body-centered cubic lattice, whereas the blue phase II has a simple cubic lattice. The crystallographic configuration of the cubic lattices may also be determined thanks to specific shapes of the pattern corresponding to specific configurations.

The homogeneous alignment of the cubic lattices may be checked thanks to the measurement of Kossel patterns at different positions of the cell. If the Kossel patterns of several crystallographic configurations are overlapped, the cubic lattices are not fully aligned. If only the Kossel pattern of a specific crystallographic configuration is measured, then the cubic lattices are homogeneously aligned.

The homogeneous orientation of the cubic lattices may also be checked thanks to the measurement of Kossel patterns at different positions of the cell. If the cubic lattices are not homogeneously oriented, several occurrence of the same Kossel pattern with different inclination in the plane of observation will be overlapped.

If the Kossel patterns of only one crystallographic configuration in different inclinations are overlapped, the cubic lattices are homogeneously aligned, but not homogeneously oriented. If only the Kossel pattern of a specific crystallographic configuration is measured, with only one inclination in the plane of observation, then all the cubic lattices are homogeneously aligned and oriented. This is for example the case in FIGS. 1 and 2.

Also, the inclination of the pattern observed corresponds to the orientation of the cubic lattices themselves when compared with the rubbing direction.

As such, in the first embodiment of the invention, the blue phase I first type of structure and the blue phase II second type of structure both have a [1,1,0] crystallographic configuration, and each exhibit their own diffraction pattern, as shown schematically on FIGS. 25 and 26.

These figures respectively show the Kossel patterns of the blue phase I and blue phase II types of structures in crystallographic configuration [1,1,0] as measured with a normal incident light beam with a wavelength of measurement equal to 436 nm with a numerical aperture of 0,9, for the Bragg reflection peak of wavelength 700 nm for the blue phase I structures and 350 nm for the blue phase II structure.

In the following, the diffraction pattern of the blue phase I type of structure in [1,1,0] crystallographic configuration will be referred to as a six-fold pattern, and the diffraction pattern of the blue phase II type of structure in [1,1,0] crystallographic configuration will be referred to as a baseball pattern.

In the second embodiment of the invention, the blue phase I first type of structure has a crystallographic configuration [2,0,0] and the blue phase II second type of structure has a crystallographic configuration [1,0,0]. They each exhibit their own diffraction pattern. In particular, the blue phase I first type of structure with crystallographic configuration [2,0,0] is a four-fold shape pattern as represented schematically on FIG. 27, and the blue phase II second type of structure is with crystallographic configuration [1,0,0] is a donut shaped pattern as represented schematically on FIG. 28.

These FIGS. 27 and 28 respectively show the Kossel patterns of the blue phase I and blue phase II types of structures in crystallographic configuration [2,0,0] and [1,0,0], as measured with a normal incident light beam with a wavelength of measurement equal to 436 nm with a numerical aperture of 0,9, for the Bragg reflection peak of wavelength 400 nm for the blue phase I structures and 488 nm for the blue phase II structure.

On FIGS. 25 to 28, the circle in doted lines represents the limits of the image seen through the microscope.

FIGS. 25 to 28 are schematic views showing different structures Kossel patterns. The structures of these Kossel patterns appear as black lines or dashed surfaces on a white background on these schematic views, while they appear as white lines or white surfaces on a black background on the experimental images as shown on FIGS. 4, 6, 7 to 12 and 29.

For example, if the Kossel pattern of the blue phase cubic lattice is a four-fold shaped pattern rotated by 30°, it means that all the cubic lattice of the zone of the liquid crystal material observed are arranged in the blue phase I type of structures, in crystallographic configuration [2,0,0] and are oriented at 30° within the bulk with respect of the rubbing direction.

A "mixed Kossel pattern" showing many overlapped four-fold shaped patterns indicates that the blue phase comprises cubic lattices arranged in the blue phase I type of structure, in crystallographic configuration [2,0,0] and are oriented randomly.

When the liquid crystal material 55 is not in a blue phase 56 stabilized by polymers, the liquid crystal molecules can arrange from blue phase I type of structure to blue phase II type of structure with the temperature and conversely.

More precisely, when the temperature increases, the liquid crystal molecules arrange from the cholesteric phase to the blue phase I type of structure, then to the blue phase II type of structure, and then into the isotropic phase. On the contrary, when the temperature decreases, the liquid crystal molecules arrange from the isotropic phase to the blue phase II type of structure, then to blue phase I type of structure and finally into the cholesteric phase.

In the optical component 1 of the invention, the liquid crystal material 55 is stabilized in said blue phase by said matrix material in polymerized form.

In other words, in the bulk 50 of the optical component 1, the liquid crystal material 55 is in blue phase 56 stabilized by polymers.

By stabilized, it is meant that the liquid crystal material 55 in the bulk 50 of the optical component 1 is maintained in the blue phase 56 under a wider temperature range than the blue phase of the same liquid crystal material when it is not contained in said bulk.

For instance, when not stabilized, the blue phase I type of structure is stable over a temperature range of approximately 0.3° C. only. Similarly, when not stabilized, the blue phase II type of structure is stable over a temperature range of approximately 3° C. only.

On the contrary when stabilized, the blue phase I type of structure is stabilized over a temperature range of approximately 20° C. to 30° C. For example, it is stabilized over the temperature range comprised between 10° C. and 35° C.

By stabilized, it is also meant that one type of blue phase structure is maintained, and that liquid crystal molecules cannot arrange from blue phase I type of structure to blue phase II type of structure (and conversely), with the temperatures.

More specifically, the blue phase 56 stabilized in the polymerized matrix material is stable at ambient temperature, and under atmospheric pressure, which allow its use for industrial purposes.

More precisely, here, the liquid crystal material 55 is stabilized at ambient temperature in the blue phase I type of structure, in at least 80% of the volume of the bulk 50.

However, even when the blue phase is stabilized, the liquid crystal molecules of the liquid crystal material 55 can still adopt the electromagnetically oriented state when they are subject to an additional electromagnetic field.

As it will be explained later, thanks to the liquid crystal material 55 stabilized in blue phase 56 and which liquid crystal molecules are able to adopt the electromagnetically oriented state, the optical component 1 can be used as a phase shift modulator.

As regards its composition, the liquid crystal material 55 of the bulk 50 here comprises a mix of two types of liquid crystal molecules, that will be referred to in the following as main liquid crystal molecules and guest liquid crystal molecules.

The main liquid crystal molecules are necessary to observe the organization of the liquid crystal material into a blue phase.

In practice, said composition forming the bulk 50 comprises from 30% to 55%, in weight relative to the total weight of the liquid crystal material (comprising main and guest liquid crystal molecules), of said guest liquid crystal molecules, and at least 45% of said main liquid crystal molecules.

Thus, the composition may comprise 30%, 31%, 32%, 33%, 34%, 35%, 36%, 37%, 38%, 39%, 40%, 41%, 42%, 43%, 4.4%, 45%, 46%, 47%, 48%, 49%, 50%, 51%, 52%, 53%, 54%, %, in weight relative to the total weight of the liquid crystal material, of said guest liquid crystal molecules. Similarly the liquid crystal material may comprise 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79% or 80% of said main liquid crystal molecules.

The main liquid crystal molecules are for instance the JC1041XX liquid crystal molecules mixture.

JC1041XX liquid crystal molecule mixture is a commercial product from JNC Corporation (Chisso), comprising derivatives of the molecule whose structure is depicted on FIG. 16. Some of those derivative may for example be 4'-(trans-4-Ethylcyclohexyl)-3,4-difluorobiphenyl of CAS number 85312-59-0, 4'-(trans-4-Propylcyclohexyl)-3,4-difluorobiphenyl of CAS number, 4'-(trans-4-Pentylylcyclohexyl)-3,4-difluorobiphenyl of CAS number 134412-17-2 or other derivatives.

In FIG. 16, R represents an aliphatic group.

The guest liquid crystal molecules might be selected from CB5 or MLC2140 liquid crystal molecules mixtures, or a mix of them.

The structure of CB5 is depicted on FIG. 17, and is also known as 4-Cyano-4'-pentylbiphenyl, with the CAS number 40817-08-1.

MLC2140 is a commercial product available from Merck.

Figure 22:
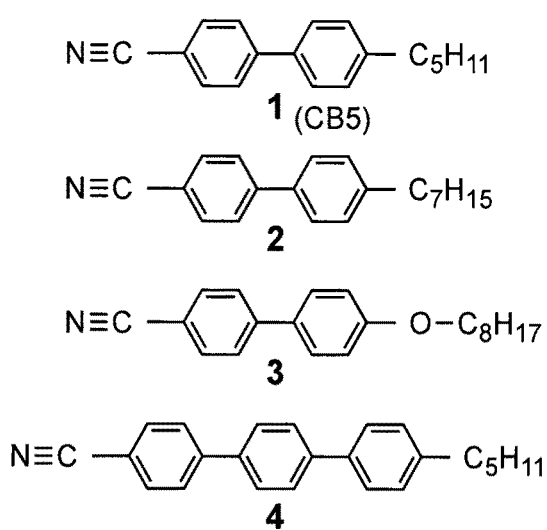
Figure 23:
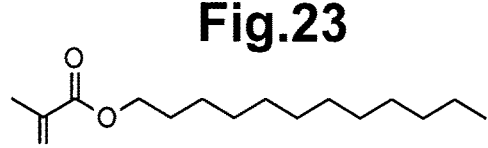

Another example of possible guest liquid crystal molecule is a mix of molecules known as E7, comprising CB5 and three other molecules as shown on FIG. 22 in a predetermined ratio of concentration, and for example available by Merck®.

The liquid crystal molecules of the liquid crystal material 55 influence the ranges of temperatures at which blue phase I and blue phase II types of structures naturally exist, when the liquid crystal material is not stabilized in blue phase.

As regards its composition, the matrix material comprises monomers that are in polymerized form. Those monomers are what enable the stabilization by forming a polymerized grid or matrix which can support and influence the orientations of the liquid crystals in an non-electromagnetic state.

More precisely, the matrix material, before it is polymerized, comprises a first type of monomer and/or a second type of monomer.

In practice, the composition forming the bulk 50 comprises, in weight relative to the total weight of said composition, at least 3.5% of said second type of monomer and from 7% to 15%, cumulative, of said first and second types of monomer. In other words, the composition forming the bulk 50 preferably comprises from 7% to 15% of monomers in total, of which at least 3.5% is of the second type of monomer.

The composition thus comprises 7%, 8%, 9%, 10%, 11%, 12%, 13%, 14%, or 15% of monomers, at least 3.5% of which is of the second type of monomer.

The first type of monomer is for instance the molecule 12CA, also known as Dodecyl Acrylate, with CAS number 2156-97-0. The second type of monomer is for instance the molecule RM257. RM257 is also known as 2-Methyl-1,4-phenylene-bis[4[3(acryloyloxy)propyloxy]benzoate], CAS number 174063-87-7.

The structures of these molecules are depicted on FIGS. 18 and 19, respectively.

Another possible example of the first type of monomer is for instance the molecule 12CM, whose more common name is Dodecyl Methacrylate, with CAS number 142-90-5. The structure of this molecule is shown on FIG. 23. In addition, the composition forming the bulk 50 comprises, in weight relative to the total weight of said composition, from 5% to 7% of a chiral dopant adapted to induce said blue phase 56 of said liquid crystal material 55.

Thus the composition may comprise 5%, 5.5%, 6%, 6.5%, or 7% of chiral dopant.

In practice, the chiral dopant is inducing said liquid crystal material 55 to arrange in blue phase, before the matrix material stabilizes said blue phase 56.

Such chiral dopant is for instance ISO(6OBA)$_2$.

The structure of this molecule is shown on FIG. 20.

Another molecule that could be used as a chiral dopant is for example C03203 by Alphamicron Chemistry.

In the examples detailed hereafter, the composition for the bulk may comprise, in weight relative to the total weight of the composition:

from 3.5% and 7.5% of RM257, and from 3.5% and 7.5% of 12CA, the sum of the two matrix monomers weight fractions being at least equal to 7% in weight, from 5% to 7% of ISO(6OBA)2, from 0.4% to 1% of IRGACURE184, also known as 1-Hydroxy-cyclohexyl-phenyl-ketone, of CAS number 947-19-3, and main and guest liquid crystal molecules.

In weight relative to the total weight of said liquid crystal molecules, the composition of this example comprises at least 45% of main liquid crystal molecules JC1041XX, and from 40% to 55% of guest liquid crystal molecules CB5. In other words, in weight relative to the total weight of the liquid crystal molecules, the composition comprises from 40% to 55% of guest liquid crystal molecules CB5, and from 45% to 60% of main liquid crystal molecules JC1041XX.

In another embodiment, in weight relative to the total weight of said liquid crystal molecules, the composition of this example comprises at least 45% of main liquid crystal molecules JC1041XX, and from 30% to 40% of guest liquid crystal molecules MLC2140. In other words, in weight relative to the total weight of the liquid crystal molecules, the composition comprises from 30% to 40% of guest liquid crystal molecules MLC2140, and from 60% to 70% of main liquid crystal molecules JC1041XX.

In tables 1 and 2 are given two possible compositions used to form the bulk 50, given in weight relative to the total weight of the composition.

TABLE 1

| Molecules | JC1041XX | CB5 | ISO(6OBA)2 | 12CA | RM257 | Irg184 |
|---|---|---|---|---|---|---|
| Composition (%) | 41.8 | 41.8 | 6 | 5 | 5 | 0.4 |

TABLE 2

| Molecules | JC1041XX | MLC2140 | ISO(6OBA)2 | 12CA | RM257 | Irg184 |
|---|---|---|---|---|---|---|
| Composition (%) | 55.7 | 27.9 | 6 | 5 | 5 | 0.4 |

The molecule IRG184, or IRGACURE184, is a photo initiator which enable to start the polymerization reaction once irradiated by a predetermined radiation.

The structure of this molecule is depicted on FIG. 21.

Advantageously, the Applicant discovered that, in the optical component 1 of the invention as a whole, each alignment layer 15, 25 improves the homogeneity of the blue phase 56 within the bulk 50 as it influences the global organization of the blue phase cubic lattices.

Surprisingly, it also appeared that the alignment layer 15, 25 may change the temperature range at which blue phase I structures and blue phase II structures appear before said structures are stabilized by the matrix material. The alignment layer 15, 25 also allows obtaining a uniform and homogeneous organization of the liquid crystal material 55 in blue phase, for the whole temperature range on which the blue phase is exhibited.

Whatever the thickness of the bulk, the rubbed polyimide layer 15, 25 ensures a very homogeneous ordering of the blue phase 56 cubic lattices in the bulk 50. An exemplary method for determining and quantifying the homogenous organization of the liquid crystal material 55 uses Kossel pattern and is explained later.

Process

In the following part is described a process for making the optical component 1 of the invention comprising the liquid crystal material 55 stabilized in the blue phase 56.

Such process comprises the steps of:

a) providing the first layer 10 and the second layer 20, the first and second layers 10, 20 forming two main surfaces 10A, 20A facing each other, at least one of the main surfaces 10A, 20A having the alignment layer 15, 25 toward the other main surface 10A, 20A, said alignment layer 15, 25 comprising polyimide;

b) filling up the space between said first and second layer 10, 20 with the composition comprising a mix of said liquid crystal material 55 and of the matrix material distinct from the liquid crystal material 55, said liquid crystal material 55 comprising liquid crystal molecules adapted to organize relative to each other to form the blue phase and said matrix material comprising monomers adapted to polymerize;

c) bringing the liquid crystal material 55 into said blue phase by inducing the liquid crystal molecules to form blue phase structures;

d) polymerizing the monomers of the matrix material while the liquid crystal material 55 is in said blue phase 56, the polymerization step d) being achieved at a polymerization temperature at which the liquid crystal material 55 exhibits at least a first predetermined minimal proportion of the blue phase I first type of structure and at least a second predetermined minimal proportion of the blue phase II type of structure.

More precisely, in step a), each layer 10, 20 can be prepared as follows: a first coating of ITO is deposited on both glass substrates 11, 21 in order to obtain a layer of ITO forming the electrode, and then, a second coating of polyimide, over said ITO coating.

The second coating of polyimide could be achieved on either one or both of the substrates coated with ITO.

The polyimide layer is then rubbed in order to obtain the alignment layer 15, 25 of said first and second layer 10, 20.

In other words, in a preferential embodiment, each alignment layer 15, 25 is formed by the rubbed polyimide layer.

The rubbing of the polyimide layer is achieved along a predetermined direction, according to a method known of the man in the art.

More precisely, it is performed in a direction parallel to the short edge of the substrate by rubbing for example with a polyester rubbing cloth using 600 rotation per minute rotational speed and stage speed of 30 millimeters per second.

As an alternative, these steps of preparing the first and second layers may be achieved in advance. For example, glass substrates comprising the ITO coating on one of its main surface 11A, 21A and, eventually, a coating of rubbed polyimide layer over said ITO coating might be purchased.

The first and second layers 10, 20 thus obtained are then placed at distance from each other, with their respective surface 10A, 20A comprising the different coatings facing each other.

The first and second layers 10, 20 may be spaced apart from 1 micrometer (μm) to 15 micrometers (μm). For instance, they could be placed at 2 μm, 4 μm, 5 μm, 7 μm, 10 μm, or even 15 μm. Preferably, the first and second layers are placed at 10 μm from each other. In step b), the space between said first and second layers 10, 20 is filled up with the composition described previously to form the bulk 50.

The first and second layers 10, 12 together with the composition comprised in between said layers 10, 20 are called hereafter a cell.

This composition comprises the liquid crystal material 55, the chiral dopant, and the matrix material.

In step b), the cell is filled up with the composition by capillarity.

In step c), the liquid crystal molecules of the liquid crystal material 55 are placed in the appropriate conditions to organize into said blue phase 56.

More precisely, the organization of the liquid crystal molecules into blue phase I type of structures is induced before the monomers of the matrix material are polymerized.

Thus, at least a fraction of the liquid crystal material is brought into said first type of structure called blue phase I before polymerization.

In this step c), the temperature at which the polymerization of step d) will be performed is also determined, as will be explained in more details later.

The polymerization step d) is achieved while at least a predetermined proportion of the liquid crystal molecules form the first type of structure called blue phase I.

More precisely, the polymerization step d) is achieved while the liquid crystal molecules material at least partly form the first type of structure called blue phase I.

To do so, the polymerization step d) is achieved at a polymerization temperature corresponding to a temperature at which a transition between said first type of structure (blue phase I) and the second type of structure called blue phase II occurs, at least a first predetermined minimal proportion of liquid crystal material exhibits the blue phase I first type of structure and at least a second predetermined minimal proportion of the liquid crystal material exhibits the blue phase II type of structure.

The current proportion of the liquid crystal material in blue phase I or II type of structure may be monitored by observing the bulk in a longitudinal plane parallel to said first and second layers 10, 20, and comparing the amount of surfaces covered in blue phase (I or II), and then the amount of surface of blue phase covered of blue phase I and blue phase II in this plane. This is achieved for example thanks to polarized optical microscope observations.

In practice, the polymerization temperature belongs to a range of transitions temperatures. The transition temperatures corresponds to the temperature between the appearance of the first zone of blue phase I in the liquid crystal material exhibiting otherwise the blue phase II type of structure and the disappearance of the last zone of blue phase II in the liquid crystal material otherwise exhibiting the blue phase I type of structure.

More specifically, the temperatures aimed at correspond here to the temperatures at which the zone having the blue phase I first type of structure represents at least the first minimal proportion, for example, at least 40% of the composition having the liquid crystal material 55 in blue phase in said plane, and the zone having the blue phase II second type of structure represents at least the second predetermined minimal proportion, for example at least 20% of the composition having the liquid crystal material 55 in blue phase in said plane.

This transition temperature range is then comprised between a first and a second critical temperature. In the present case, the first critical temperature corresponds to a proportion of 40% of blue phase I structures in the composition having the liquid crystal material in a blue phase in said plane, and the second critical temperature range corresponds to a proportion of 20% of blue phase II structures of the composition having the liquid crystal material in blue phase in said plane.

The first and second critical temperatures depend on the composition of the bulk. In the examples given above, with the compositions of tables 1 and 2, the first critical temperature is about 37.4° C. for the composition of table 1, and about 67.5° C. for the composition of table 2.

The second critical temperature, for the composition of table 1 is about 36.6° C. for the composition of table 1, and about 66° C. for the composition of table 2.

More precisely, in step c), the liquid crystal molecules of the liquid crystal material 55 are placed in the appropriate conditions to organize into said blue phase 56, in such a manner that a predetermined proportion of blue phase I and blue phase II types of structure are formed in the composition having the liquid crystal in blue phase when the polymerization of step d) is triggered.

This is achieved through at least one thermal cycle, comprising the following steps:

m) the temperature of the liquid crystal material is increased until all the liquid crystal molecules are organized relative to each other to form mostly the blue phase II second type of structure;

n) the temperature of the liquid crystal material is lowered slowly until the blue phase I first type of structure represents said first predetermined minimal proportion of the liquid crystal material in blue phase.

A way to achieve that is to perform a calibration thermal cycle to determine the temperature at which the said first predetermined minimal proportion of the liquid crystal material is reached during the decrease of temperature, and then the steps m) and n) described above.

During the calibration cycle, the temperature is for example raised until the liquid crystal material in blue phase is only in the blue phase II type of structure and then lowered until the liquid crystal material in blue phase is only in the blue phase I type of structure.

The calibration cycle is necessary to determine the polymerization temperature and ensure that the alignment and orientation of the cubic lattices of the blue phase are homogeneous.

It is also possible, during the calibration cycle, to increase the temperature until the liquid crystal material is brought into the isotropic phase thanks to a rapid increasing temperature ramp, and then decrease the temperature at a slow rate from the isotropic phase to the cholesteric phase through the following phase transitions: isotropic phase to blue phase II to blue phase I to cholesteric phase.

The analysis of the proportion of blue phase I type of structure present in the liquid crystal material at different temperatures allows to determine the polymerization temperature at which the minimal proportion of blue phase I looked for is observed.

The thermal cycle with steps m) and n) is then performed, and in step n), the decrease in temperature is stopped when the predetermined polymerization temperature is reached.

While the calibration thermal cycle is performed, the proportion of current phases in the cell is checked via Kossel pattern and/or polarized optical microscope observation to check the phase distribution in the field of view of the microscope.

The apparition of blue phase I or II is evaluated by visual inspection of the samples upon cooling. Blue phases have a very characteristic color due to Bragg reflection. The observation in reflection mode makes possible to establish the temperature ranges where the blue phase I and blue phase II types of structures appear.

Polarized optical microscopy can therefore establish the proportion of blue phase present in the bulk, and the proportion of blue phase I and II present in the liquid crystal material in blue phase: there are specific colors shown by the blue phases I and II, whereas other phases have no color and are seen as black regions.

Moreover, specific colors are associated with the different crystallographic configurations, the polarized optical microscopy can then also allow to evaluate the alignment of the cubic lattices of the bulk.

The homogeneity of alignment and orientation of the cubic structure of the blue phase I or blue phase II types of structures is also checked thanks to the Kossel patterns measured at different location of the cell.

The first and second critical temperature are determined respectively when the blue phase I type of structures cover at least 40% of the surface of the bulk having the liquid crystal material in blue phase observed by polarized optical microscopy and when the blue phase II type of structures still cover 20% of the surface of the of the bulk having the liquid crystal material in blue phase.

Alternatively, spectrophotometry could also be used to determine the percentage of liquid crystal material 55 that is in blue phase II type of structure.

The proportion of blue phase I and blue phase II types of structure in the bulk may be determined through the spectrophotometry measures.

More precisely, the spectral Bragg reflections for blue phase I and blue phase II types of structures are determined. There are two distinctive peaks, located near two wavelengths $\lambda 1$ and $\lambda 2$ exhibiting a maximum intensity $I1$ and $I2$. The proportion of blue phase I type of structures over blue phase II types of structures may be deduced from the ratio of the intensities $I1/I2$ of the two peaks.

For example, if $I1/(I1+I2)$ is over 80%, we can deduce that the percentage of BPI in said volume of the bulk is 80%.

According to the example described, polymerization is achieved while there is still some blue phase II type of structures left in the bulk. The homogeneity of alignment and orientation of the blue phase finally obtained is thus improved. The alignment and orientation of the blue phase II structures indeed influences the alignment and orientation of the blue phase I structures.

During the calibration thermal cycle, the following features of the liquid crystal material are thus determined:
  proportion of the bulk exhibiting a blue phase,
  proportion of the bulk in blue phase exhibiting a blue phase I or II structure;
  proportion of the blue phase I or II structures having cubic lattices in homogeneous alignment,
  proportion of the blue phase I or II structures having cubic lattices in homogeneous alignment and orientation.

The polymerization temperature is also determined to be in the range between the first and second critical temperatures.

During step m) of the thermal cycle, the liquid crystal material may also be brought into the isotropic phase thanks to a rapid increasing temperature ramp. In this case, the decrease of temperature in step n) bring the liquid crystal material from isotropic phase to blue phase II to blue phase I, until the polymerization temperature determined based on the first thermal cycle is reached.

Then step d) is performed: the polymerization process is performed at this determined polymerization temperature.

In another variant, it is possible to consider that the polymerization temperature has been predetermined.

In that case, a unique thermal cycle with steps m) and n) may be performed.

While the unique thermal cycle is performed, the proportion of current phases in the cell may be checked via polarized optical microscope observation and/or spectrophotometry to check the phase distribution in the field of view of the microscope and/or treatment of the Kossel patterns. The homogeneity of alignment and orientation of the cubic structure of the blue phase I or blue phase II types of structures is also checked thanks to the Kossel patterns measured at different location of the cell.

FIG. 29 shows an example of the different Kossel pattern observed during a calibration cycle at different temperatures. The composition here comprises 46.5% of CB5, 46.5% of JC1041XX, 7% of $ISO(6OBA)_2$ for a thickness of 10 μm with alignment layers of rubbed polyimide. The incident light has a wavelength of 436 nm, the Numerical aperture is 0.85.

Thanks to the Kossel patterns, is it possible to verify that between temperatures 45.997 and 44.826° C., the liquid crystal material exhibits pure blue phase II type of structures with homogeneous alignment in crystallographic configuration [1,0,0]. Between temperatures 44.776 and 44.769° C., the liquid crystal material exhibits a mix of blue phase I and II types of structures with homogeneous alignment in crystallographic configuration [2,0,0] and [1,0,0], respectively. Between temperatures 44.713 and 44.276° C., the liquid crystal material exhibits pure blue phase I type of structures with homogeneous alignment in crystallographic configuration [2,0,0].

The treatment of the Kossel pattern with mixed pattern may also enable to quantify the proportion of each phase detected through its pattern.

In particular, if the measurements achieved by spectrophotometry and/or polarized optical microscopy and/or Kossel patterns treatment show the following:
  at least 80% of the bulk is in blue phase I or II, that is, 20% of the bulk is not in blue phase,
  alignment is homogeneous in at least 80% of the liquid crystal bulk, that is, 20% of the bulk is either aligned differently or not in blue phase (BP),
  orientation of the Kossel pattern is homogeneous in at least 80% of the bulk, with the same direction of orientation, for example 45° (±5°), that is, the other 20% is either oriented otherwise, aligned differently or not in blue phase (BP),
then the polymerization step d) is performed without repeating the calibration thermal cycle or steps m) and n) of the thermal cycle.

If the previous features are not observed in the bulk when the predetermined temperature is reached, then the temperature is lowered so that the liquid crystal material arranges into the cholesteric phase and a second thermal cycle with steps m) and n) is performed as described above.

As another variant, any number of calibration thermal cycle may be performed before performing steps m) and n) of the thermal cycle.

In the thermal cycles described above, the slow rate at which the temperature is decreased is comprised between 0.05° C. per minute and 0.5° C. per minute, preferably equal 0.1 degree Celsius per minute, In step d), the polymerization consists in an UV-irradiation of the composition, achieved with a light beam of power rate ranging from 0.1 $mW/cm^2$ to 1 $mW/cm^2$.

In practice, the power rate should be kept low to ensure the blue phase alignment is not destroyed during polymerization.

The wavelength of the UV light beam irradiating the composition depends on the photo-initiator absorption range. Here, with Irg184 photo-initiator, the UV light may have wavelengths ranging from 300 nm to 380 nm, and is preferably equal to 365 nm (nanometers).

Of course, the polymerization is achieved at the polymerization temperature, determined as described before, or at least at a temperature in the transition temperature range comprised between the critical temperatures defined before.

The irradiation is achieved for a duration ranging from 5 minutes to 2 hours, preferably for 30 minutes.

In practice, the duration of irradiation to ensure completeness of polymerization depends on the power rate of the light beam. For instance, at a power rate of 0.4 mW/cm$^2$, the duration of irradiation can be more than 10 minutes.

For example, the polymerization consists in an UV-irradiation at a wavelength of 365 nanometers with a power rate of 0.4 mW/cm$^2$ for 30 minutes.

The composition thus polymerized forms the bulk 50 of the optical component 1 according to the invention.

Advantageously, the polymerization leaves the bulk 50 transparent, that is to say that visible light can go through said bulk with no absorption, not counting the spectral range where the Bragg reflection occurs depending on the lattice size of the blue phase, its orientation, and the incident angle of the light.

Use of the Optical Component 1 According to the Invention

The optical component 1 of the invention may be an optical lens with a tunable filter, or may be used as a spatial phase modulator.

For that, the electrodes 12, 22 of first and second layers 10, 20 are connected to a power source.

The liquid crystal material 55 of the bulk 50 can thus be placed into an electric field, said electric field influencing the orientation of the liquid crystal molecules.

Indeed, the orientation of the liquid crystal molecules is imposed by the direction of the electric field. In other words, when an electrical tension, or voltage, is applied between the two electrodes 12, 22 of the optical component 1, the liquid crystal molecules tend to align along a certain favorable direction along the electric field.

It has been shown that a light beam going through the optical component 1 of the invention is influenced by the orientation of the liquid crystal molecules comprised in said optical component 1.

Thus, one may control the influence of this optical component 1 on light beams going through this article, by controlling the tension applied between the two electrodes 12, 22 of said optical component 1. The "influence" of the optical component 1 on light may include the deviation of the incident light beam or its phase shift.

Depending on the voltage applied between the electrodes 12, 22 of the optical component 1, liquid crystal molecules align more or less along said electric field.

Notably, to be able to align a majority of these liquid crystal molecules along the electric field despite the stabilization of the liquid crystal material 55 in blue phase, the electrical tension should be strong enough to dominate the preferential physical interaction existing between these liquid crystal molecules in blue phase.

Nevertheless; if all liquid crystal molecules of the liquid crystal material 55 are very well organized in blue phase, so that said liquid crystal material 55 is uniformly and homogenously organized, the liquid crystal molecules will react in the same fashion to the electric field. Consequently, a rather small voltage could have a great effect on the global orientation of the liquid crystal material 55, which would influence greatly a light beam going through said optical component 1.

Thus, thanks to the uniform organization of the liquid crystal material 55 in blue phase in the bulk 50 of the optical component 1, the voltage required to reach a given phase modulation of a light beam going through said optical component 1 is decreased. It is also possible to reach smoother and higher values of phase shift as discussed later.

Advantageously, a uniform organization of the liquid crystal material 55 of the bulk 50 allows obtaining a homogeneous switch from the blue phase to the electromagnetic oriented phase when applying voltage, and therefore allows a good phase shift modulation.

In particular, a uniform organization of the liquid crystal material according to the first embodiment of the invention allows a particularly good phase shift modulation.

Experimental Setup

The experimental setup combines polarized optical microscopy with the observation of Kossel pattern, spectrophotometry and in situ control of the temperature.

To observe the optical Kossel pattern, a polarized light microscope was used. The Kossel pattern is the diffraction pattern and is formed on the pupil plane (Fourier image). The polarized light microscope has a pupil observing system for conoscope imaging.

Objective lens forms an image of an object on the CCD image plan. That is, object plane and image plane are conjugate. The polarized light microscope comprises a Bertrand lens in order to form a pupil image (Fourier image) on the CCD image plane.

More precisely, a Nikon Eclipse LV100POL polarized light microscope was used. Interference filter is required because the diffraction angle depended on wavelength. A λ=436 nm filter to obtain an appropriate size pattern, which was installed in a folder for sharp color filter. In order to cover large diffraction angle, high NA objective lens was required. A Nikon CFI Plan LWD IMSI 100× NA0.85 was used. It has a compensation ring to compensate spherical aberration caused by upper glass plate of the liquid crystal cell. By inserting Bertrand lens and focusing it, the Kossel pattern can be observed. The INSTEC hot stage TS62-MS200 and controller MK2000 was installed on the microscope sample table. Blue phase appearance is very sensitive to its temperature. This hot stage can control its temperature within ±0.05° C. in the range of −30° C. to 120° C.

EXAMPLES, CHARACTERIZATION AND COMPARISONS

1/Alignment Layer

Different alignment layers were tested to be compared to rubbed polyimide layer.

Three different types of alignment layers were tested: polyimide layers, F-POSS layers and Optool layers. These three types of alignment layers were tested as such (non-rubbed), and after a rubbing process, and they were then compared.

F-POSS and Optool are two surfactants.

F-POSS is Fluorinated Polyhedral Oligomeric Silsesquioxanes, with the structure shown of FIG. 29. In practice, the polyimide layer can be already present on substrates available from the market (for example distributed by EHC Co Ltd). Half of the bought substrates had the polyimide layer, the other half left untreated.

The F-POSS, respectively Optool, layers were obtained from deposition of said F-POSS, respectively Optool, surfactant on an ITO layer present on glass substrates by spin coating. Half of them went through the rubbing process, half of them were left untreated.

Identical substrates were assembled two by two at distance from each other as explained in step a) of the process according to the invention.

More precisely, the substrates were placed at 10 μm from each other.

After assembly, the empty cells were filled up with the liquid crystal material 55 in isotropic phase, that is to say in a liquid state and at a temperature above the clearing point.

The liquid crystal material is filled up inside the cells by capillarity. The example composition is:
chiral dopant ISO(6OBA)2: 6%,
liquid crystal molecules (main+guest): JC-1041XX+CB5: 94%, with about 50% of JC-1041XX and 50% of CB5.

A control cell was also manufactured form glass substrates with ITO layer only, and no alignment layer at all.

The cells thus formed were then observed by Polarized Optical Microscopy and underwent a Kossel pattern analysis. When the cells comprising the Optool layers rubbed or non-rubbed, or the F-POSS layers rubbed or non-rubbed, or non-rubbed polyimide layers were observed under polarized optical microscopy, a platelet organization was observed, which proves that both blue phase I first type of structure was observed but oriented randomly. In other words, the blue phase of these cells was not ordered but formed regions of different orientation.

Figure 3:
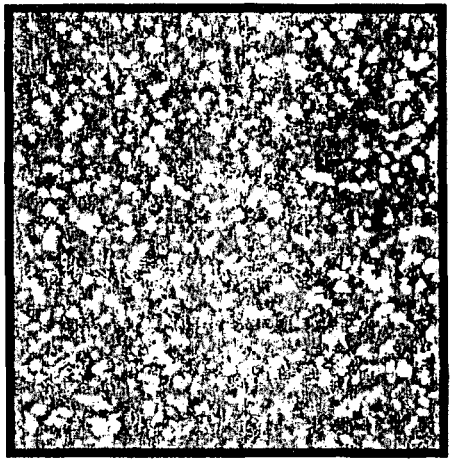
FIG. 3 is a picture obtained from a polarized optical microscope, of an optical component of which the layers have toward the bulk a layer of optool surfactant.
Figure 4:
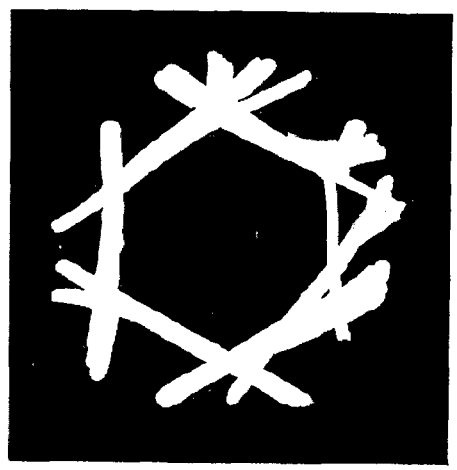
FIG. 4 is a schematic representation of a Kossel pattern obtained from the same optical component as the one used to obtain FIG. 3.

Such platelets are shown on FIG. 3.

This was also the case for the control cells with no alignment layer at all.

On the contrary, the cells comprising rubbed polyimide layers showed, when observed under polarized optical microscopy a homogeneous and uniform color, and no platelets. Such homogeneous observation is shown on FIG. 5.

Figure 5:
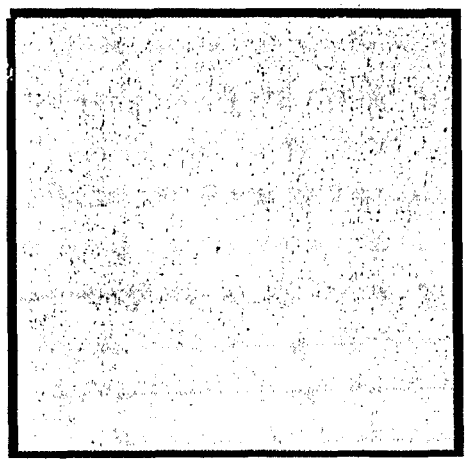
FIG. 5 is a picture obtained from a polarized optical microscope, of an optical component according to the second embodiment of the invention, of which the layers have toward the bulk an alignment layer comprising rubbed polyimide.

On FIGS. 3 and 5, the scale of observation is 1 millimeter square, checked along the whole surface of the cell. The temperature of observation is 44.4° C. Here, the observation takes place before polymerization occurs.

The Kossel pattern analysis confirmed these observations. Indeed, for the cells showing a platelet organization, the Kossel pattern is an overlapping of different Kossel patterns. Such Kossel pattern is represented on FIG. 4. Such Kossel pattern comprises superimposed square shapes.

This means that the blue phase I type of structure is present in the bulk, and that the cubic lattices of the blue phase I are not uniformly organized.

Figure 6:
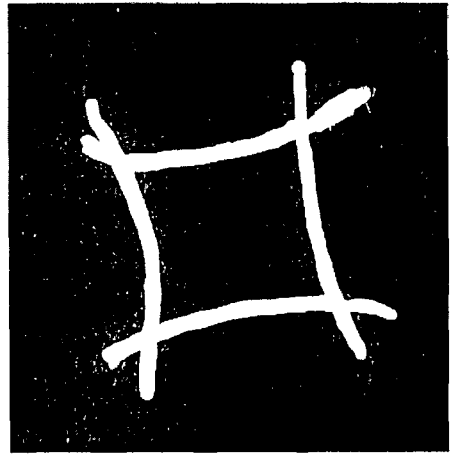
FIG. 6 is a schematic representation of a Kossel pattern obtained from the same optical component as the one used to obtain FIG. 5.

The Kossel pattern obtained from the optical component according to the invention is represented on FIG. 6. Such Kossel pattern is a unique four fold pattern (a kind of square), which means that only the blue phase I type of structure is present in the bulk, and that all the cubic lattices of this blue phase I are uniformly organized in space.

The square shape of the Kossel pattern being characteristic of blue phase I type of structure as demonstrated hereunder.

The cubic lattices of the blue phase I type of structure are arranged with the rubbing direction of the polyimide layers, as only one square is represented on the Kossel pattern instead of superimposed squares. By "arranged", we mean that they are disposed such that their axis Ox, Oy are parallel to the surface of the rubbed polyimide pattern, and oriented around their axis Oz such that they all have the same orientation relative to the direction of the rubbing.

Consequently, the rubbed polyimide layers were the ones providing the best uniformly organized blue phase of the liquid crystal material in the bulk.

In the rest of the experiments, only rubbed polyimide layers were used as alignment layers.

2/Cell Thickness and Homogeneity

Blue phase organization was studied using rubbed polyimide as alignment layer in different cell thicknesses: the organization of the blue phase is assessed by polarized optical microscopy and by Kossel pattern analysis.

A number of cells with rubbed polyimide and different thickness were manufactured and filled with the liquid crystal mixture described above in the paragraph regarding the alignment layer. The analyzed cell were 2 micrometers, 4 micrometers and 10 micrometers thick respectively, that is to say that the bulk were 2 µm, 4 µm or 10 µm thick (not the whole optical component). As a first step, all cells underwent an increase and decrease of temperature, corresponding to the first thermal cycle described before, to find the appropriate temperature range where the blue phase I zone is present with the predetermined proportion, and to reach a state where, in pure blue phase II zone, at least 80% of the area is in homogeneous blue phase II.

Here, the transition temperature ranges between the first and second critical temperature, namely 44.8° C. and 43.8° C. Polymerization was then achieved in this transition temperature range, after the second thermal cycle, so that the transition temperature range is attained by reduction of the temperature.

Then the uniformity of the stabilized blue phase organization was evaluated under the polarized optical microscope.

The results show that blue phase, in blue phase I structures, was more uniformly organized for thinner cells, such as the ones that were 2 µm thick. Indeed, the image obtained by polarized optical microscopy for such cells was of uniformed color.

Moreover, the organization remained constant during the whole temperature range in which the blue phase I type of structure, respectively the blue phase II type of structure, was exhibited.

When the cell thickness increases, the uniformity of the blue phase organization decreases. This is seen on the images obtained by polarized optical microscopy by a platelet image replacing the uniform colored image.

However, using the process of the invention, even for 10 µm thick cells, at least 80% of the blue phase could be obtained as homogeneous. The inventors estimate that the teachings of the invention would provide benefits in increased percentage of alignment and homogeneity for cells of greater thickness than 10 µm, for example up to, 20 µm, 50 µm or even 100 µm.

The proportion of blue phase in the bulk and the homogeneity of alignment and orientation of this blue phase is estimated according to the following protocol.

From a visual examination of the surface of the cell by polarized optical microscopy, the proportion of blue phase in the bulk may be roughly determined.

If this first examination reveals that there is a sufficient amount of blue phase in the bulk, preferably more than 80% of the bulk being in a blue phase, the Kossel pattern is determined in 10 different locations along the active area of the cell. If 8 images or more Kossel pattern correspond to the same blue phase (BPI or BPII), the proportion of blue phase in the cell is at least 80%.

The active area here encloses the surface of the cell and at least a part of the volume of the cell below the surface.

The measurement here reflects the properties of the bulk as the thickness of the bulk is very small compared to the area of the cell measured.

Likewise, the Kossel pattern is determined in 10 different locations along the active area of the cell. If 8 or more Kossel patterns measured correspond to a specific blue phase with a given alignment of the cubic lattices (for example crystallographic configuration [1,1,0]), then the alignment is at least 80% of the volume of the bulk.

If 8 or more Kossel patterns measured are oriented in the same direction (for example for example 45° (±5°)), then the orientation of the cubic lattices is the same at least in 80% of the volume of the bulk.

The decrease in uniformity associated with the increase of the cell thickness is probably due to the stacking of the blue phase cubic lattices. Indeed, it has to be taken into account that the average blue phase I type of structure has a lattice size around 250-290 nanometers. Consequently, only a few stacked cubic lattices are able to fit inside a thin cell, thin cells thus having a bulk more easily uniformly organized.

The blue phase cubic lattices near the main surfaces 10A, 20A, remain aligned, while the ones in the bulk are less constraint and can eventually rotate. It explains why different domain of blue phase I type of structure can be observed in thicker cells.

However, it is currently preferred to have a cell thickness of approximately 10 μm to enable greater phase shift; this thickness can be used due to the process of the invention which enables for example more than 80% homogeneity even for 10 μm cells.

3/Blue Phase I or II Types of Structure

All cells were manufactured with rubbed polyimide and were analyzed with Kossel patterns analysis to monitor the phase change.

The composition is the same as the one described in the first paragraph.

First, the phase and the temperature ranges associated with these phases are obtained.

Here, the temperature associated with blue phase I type of structure ranges from 44.7° C. to 43.6° C., which correspond to the temperatures in between which from 50% to 90% of the liquid crystal material 55 total is in blue phase I type of structure. The temperature associated with blue phase II type of structure ranges from 45.8° C. to 44.7° C., which correspond to the temperatures in between which from 50% to 90% of the liquid crystal material 55 is in blue phase II type of structure. Then, the orientation and type of structure of the blue phase cubic lattices is identified.

As it can be seen on FIGS. 7, 9 and 11, blue phase II type of structure in the crystallographic configuration [1,0,0] is associated with a donut-shaped Kossel pattern. This pattern corresponds to blue phase II second types of structures which cubic lattices are organized with their axis Ox Oy parallel to the layers 10, 20 of the optical component. When decreasing the temperature, the pattern is slowly changed into blue phase I type of structure, as shown on FIGS. 8, 10, 12, that represent a typical four-fold pattern, that is to say the blue phase I type of structure which cubic lattices are organized with their axis Ox Oy parallel to the layers 10, 20 of the optical component, that is to say in crystallographic configuration [2,0,0].

The Kossel patterns indicate that the orientation of the cubic structure is not modified when the arrangement of liquid crystal molecules is changing from blue phase II type of structure to blue phase I type of structure: the faces of the cubic lattices stay parallel to the substrates 11, 21 on which they rest.

Moreover, it can be deduced from FIGS. 8, 10 and 12 that the cubic lattices is oriented within the rubbing direction of the alignment layer 15, 25.

On the examples of FIGS. 1 and 2, the rubbing direction is Oy. Two of the edges of the four fold Kossel pattern are oriented parallel to the rubbing direction (Oy), which is equivalent to say that four parallel edges of the cubic structures are parallel to Oy.

This last feature cannot be concluded from the Kossel pattern of the blue phase II type of structure as the donut shape does not give additional information about the alignment of cubic lattices along the rubbing direction.

On the whole, the Kossel patterns show that there is a high probability that the blue phase cubic lattice in blue phase II is oriented within the rubbing direction in all cases.

4/Alignment Analysis, Uniformity of Organization

For the polymer stabilization process new cells were manufactured.

Two different types of liquid crystal guest molecules were tested in the liquid crystal material: CB5 and MLC2140 molecules.

It corresponds to the two compositions previously given in table 1 and 2.

All manufactured cells underwent temperature hysteresis cycle to find out the blue phase temperature ranges: they underwent the first thermal cycle as described before.

The cells were also analyzed by Kossel pattern to determine whether blue phase I and/or II type of structure were obtained and to check the orientation of the blue phase cubic lattices.

After this analysis, a temperature where blue phase I type of structure is present was selected for the polymer stabilization process. For the composition of table 1, comprising the CB5 guest liquid crystal molecules, the cells were analyzed while cooling down the composition sandwiched between first and second layers 10, 20. In all cases very well aligned cubic lattices and homogeneous liquid crystal material were obtained for all cells of 2 μm, 4 μm, 7 μm, 10 μm and 15 μm, for both temperatures at which blue phase I and blue phase II type of structure are exhibited.

Blue phase II type of structure was characterized by a pale-reddish color in polarized optical microscopy that became darker as the thickness of the cell increased. In this case very clear Kossel pattern in the shape of baseball pattern was observed, which means that the cubic lattices of the blue phase II are oriented so that only the Oy axis is parallel to the first and second layers 10, 20, that is to say that they are in crystallographic configuration [1,1,0]. Blue phase I type of structure also showed a very specific red color in polarized optical microscopy. Again very well aligned and homogeneous liquid crystal material was obtained and the Kossel pattern analysis determined that the cubic lattices were in crystallographic configuration [1,1,0].

The obtained Kossel patterns, for both blue phase II and blue phase I types of structure were oriented at 45° with respect to the rubbing direction of the alignment layer (Oy, rubbing direction is generally roughly horizontal on the Kossel patterns images). This orientation is observed in the surface of the bulk at all times. This means that the cubic lattices of the blue phase I and/or II structures are oriented at 45° with respect to the rubbing direction.

The same thermal cycle and Kossel analysis was performed for the cells comprising the composition of table 2, that is to say comprising the MLC2140 guest liquid crystal molecules.

New cells were manufactured with a thickness of 4 μm, 10 μm and 15 um, with rubbed polyimide as alignment layer and they were characterized to find an adequate temperature for polymer stabilization.

The alignment, structure and orientation found in the cells comprising the composition of table 2 are completely similar to that of the cells comprising the composition of table 1. Very homogeneous liquid crystal material 55 in crystallographic configuration [1,1,0] was obtained in the bulk, as shown by the Kossel pattern analysis. The cubic lattices are oriented at 45° in respect with the rubbing direction of the alignment layers 15, 25 of the substrates 11, 21.

These experiments also show that the uniform alignment of the cubic lattices in the blue phase I type of structures is observed before and after polymerization. It is also the case for the blue phase II type of structure. As a whole, polymerization does not change the alignment of cubic lattices.

5/Polymer Stabilization

Polymer stabilization was performed in every analyzed cell at a fixed controlled temperature.

The polymerization temperatures would be as follows:

For the CB5 liquid crystal host: polymerization was achieved between 37.4° C. (first critical temperature) and 36.6° C. (second critical temperature), preferably around 37.1° C.

For the MLC2140 liquid crystal host: polymerization was achieved between 67.5° C. (first critical temperature) and 66.0° C. (second critical temperature), preferably around 66.3° C.

For the polymerization, each cell was irradiated by UV light, at a wavelength of 365 nm, at a power rate of 0.4 mW/cm$^2$ and for 30 minutes.

The homogeneity of the bulk was controlled during the polymer stabilization process. The uniformity, that is to say, the homogeneity, of the blue phase I type of structure and orientation and alignment of the cubic lattices were checked before and after the polymerization.

For both compositions of tables 1 and 2 comprising CB5 or MLC2140 liquid crystal guest molecules, and for every thickness that was manufactured, the Kossel patterns determined that the orientation of the blue phase I type of structure did not change after the polymerization process, while observed at room temperature, compared to that observed before polymerization.

In the current example the blue phase I type of structure remained in crystallographic configuration [1,1,0], that is to say with the axis Ox, Oz of the cubic lattices oriented at 45° with respect to the normal of the alignment layer 15, 25, before and after polymerization.

Using this protocol, very uniformly organized liquid crystal material 55 and very homogeneous bulk 50 were obtained, with liquid crystal molecules arranged in blue phase I type of structure, in a controlled crystallographic configuration [1,1,0], with a homogeneous orientation, and stabilized by polymerization.

Moreover, it has been found that after polymerization, the proportion of blue phase I type of structure has been kept or even improved.

This may be the result of the conversion of blue phase II type of structure into blue phase I.

6/Phase Shift as a Function of Voltage

The phase shift study was performed for all manufactured cells after the polymer stabilization process, using a Mach-Zender interferometer.

Phase shift measurements were performed in cells with different thicknesses with no alignment layer (control cells, FIG. 13) and with rubbed polyimide coated layers (FIGS. 14, 15) for comparison purposes.

All the stabilized cells were measured at room temperature for studying the phase shift modulation.

While comparing control cells and rubbed polyimide cells, evident differences were found between them, both on the behavior of the blue phase and on the physical properties associated. Several factors were compared:

Saturation voltage (Vsat), which corresponds to the voltage for which the maximum phase shift is obtained, Threshold voltage (Vth) which corresponds to the amount of applied voltage that is necessary to produce any response in the liquid crystal.

Vth can be measured by finding the difference in voltage necessary to go from a 10% to a 90% maximum phase difference, where 10% is the threshold voltage, Vth, and 90% is the saturation voltage, Vsat.

Maximum phase shift which corresponds to the maximal value of the phase shift.

Saturation voltage Vsat, and threshold voltage Vth, occurred at lower voltages for the control cells with no alignment layer. FIGS. 13 to 15 show the phase shift obtained as a function of the voltage applied. On these figures, the liquid crystal molecules used is specified at the bottom of each figure, and the maximum phase shift obtained is given for each curve. Moreover, on these figures, the curves are labelled with the thickness of the corresponding cell. Notably, in FIG. 13, C5 marks the results obtained for the 5 μm thick cell, C10 those for the 10 μm thick cell, and C15 those for the 15 μm thick cell; in FIG. 14, D2 marks the results for the cell with a thickness of 2 μm, D4 marks the results for the cell with a thickness of 4 μm, D7 marks the results for the cell with a thickness of 7 μm, D10 marks the results for the cell with a thickness of 10 μm and D15 marks the results for the cell with a thickness of 15 μm; in FIG. 15, E4 marks the results for the 4 μm thick cell, E10 those for the 10 μm thick cell, E15 those for the 15 μm thick cell.

As seen in FIG. 13, the maximum phase shift obtained for the control cells (no rubbed polyimide layer) filled with composition of table 1, was 1.56π for the 15 μm thick cell (C15), upon saturation. The maximum phase shifts obtained for the same thickness was higher for the cells with rubbed polyimide layer according to the invention filled with composition of table 1 as shown on FIG. 13 (curve C15), as this phase shift reaches 1.57 π before saturation.

This is also visible on the data collected for the 10 μm thick cells: maximum phase shift is 0.85π upon saturation in the control cell, whereas it reaches at least 1.4π in the similar cell with rubbed polyimide. Indeed, as mentioned before, a uniformly organized blue phase of the liquid crystal material allows a smooth and ordered switching of the liquid crystal molecules from blue phase to the electromagnetically oriented state, so that the liquid crystal molecules of the cubic lattices are "switching" in the same fashion, that is to say align along the electromagnetic field in the same way.

Moreover, the fact of having a cell with a uniformly organized blue phase covering most of the cell allows to have a cell that exhibit uniformly the optical index of this blue phase, not modified by areas of liquid crystal in cholesteric phase, for example. The difference of optical index between the blue phase and the electromagnetically oriented state is maximum.

For this reason a higher contribution to the phase shift and a better electro-optical performance can be obtained for the cells with a uniform organized blue phase of the liquid crystal material.

Moreover, the slope of the phase shift variation as a function of applied voltage is smaller in the cells with rubbed polyimide, for similar thickness of cells, than in control cells. This allows to control more precisely the phase shift of the cell as a function of the voltage. The maximum acceptable slope depends on the use of the cell, In order to vary the focus of a microscope, a maximum slope of 0.1π per 10Volts is to be preferred.

The composition of table 2 was also used for the bulk. The phase shifts of the cells according to the invention filled with the two different compositions were measured and compared.

Different thicknesses were prepared in order to establish the maximum phase shift that can be obtained for each cell, depending on the thickness and the guest liquid crystal molecules that were used.

In general, it can be seen from the results that the thicker cells allow to reach higher values of phase shift upon saturation than thinner cells, and that higher voltage is needed to reach this saturation than in thinner cells, no matter which guest liquid crystal molecule was used.

The birefringence, that is to say the difference of index between the ordinary index and the extraordinary index of the liquid crystals, for CB5 liquid crystal molecules is $\Delta n=0.19$, and the birefringence for MLC2140 liquid crystal molecules is $\Delta n=0.253$. Understandably, it is expected to obtain a larger phase shift for a guest liquid crystal molecule whose birefringence is larger, in this example with the composition comprising MLC2140 molecules. As MLC2140 has a higher birefringence than CB5, and both are aligned and oriented in the same direction, the obtained phase shifts are larger for MLC2140 for the same thicknesses.

As shown on FIGS. 14 and 15, the voltages Vth and Vsat for both types of bulk composition are not significantly different at a fixed cell thickness. For instance, at 4 µm, Vth is approximately equal to 25V, and the Vsat is equal to 70V, for the cell comprising the composition of table 1 (FIG. 13); while Vth is equal to 20V, and the Vsat is equal to 65V, for the cell comprising the composition of table 2 (FIG. 14).

However the maximum applied voltage that the experimental setup could reach was 200V which was not enough to achieve the saturation voltage in some cases (see curves 10 and 15 on FIGS. 14 and 15). Thus, the comparison of the Vsat was not possible for the two types of bulk composition, at 10 µm and 15 µm thicknesses.

As seen on FIG. 14, the maximum phase shift of the bulk comprising CB5 in its composition (composition of table 1), for the 2 µm thick cells, was 0.467 although the maximum applied voltage did not exceed 110V, due to subsequent overheating of the cell.

Phase shift achieved for the 7 µm and 10 µm thick cells were 0.957 and 1.4π respectively. Maximum phase shift achieved was 1.57π for the 15 µm thick cells. However, from the obtained response curve, it is clear that the 15 µm thick cells cannot reach Vsat within the 200V range. With extrapolated data from all the measured samples, a 1.7π phase shift is expected to be achieved at 225V.

As seen on FIG. 15, the maximum phase shifts obtained with the bulk comprising MLC2140 in its composition (composition of table 2) were higher than those obtained with the bulk comprising CB5. Notably, the phase shift for the 2 µm cells reached 0.8π, that is to say was twice as big as the one obtained for the cell comprising CB5 molecules. Similarly, the phase shift for the 10 µm cells reached 1.92π.

The bigger is the birefringence of the liquid crystal material used, the bigger is the expected phase shift.

A liquid crystal material with high birefringence is therefore preferred in the optical component and method of manufacturing according to the invention. Moreover, the index of the blue phase depends on the size of the cubic lattices, which means that the phase shift may vary with the type of the blue phase I or II and with the crystallographic configuration of this blue phase.

Accordingly, a blue phase with crystallographic configuration [1,1,0] is preferred.

On FIG. 15, the Vsat was achieved at 200V for the 10 µm thick cells only, which means that a thicker cell would eventually need more voltage to reach its maximum phase shift. Nevertheless the 15 µm thick cells were also measured, reaching a phase shift of 1.95π at 200V, given that these devices did not reach the saturation voltage. From the extrapolation of the measured cells data the 15 µm thick cells with a composition comprising MCL2140 should produce a 2.2π phase shift at 225V.

In addition, every phase shift measurement was performed for both vertical and horizontal polarizations of the light beam entering the optical component 1. The electro-optical response—phase shift as a function of the voltage applied, and maximum phase shift values achieved were essentially the same for both polarizations in all cases (with variations of 0.05π at most), thus demonstrating the polarization independency of the optical component 1 according to the invention.

On the contrary, the maximum phase shift obtained for the horizontal and for the vertical polarizations for the control cells was not the same, having even a difference by 0.27π some cases. Indeed, it is likely that the liquid crystal material and bulk homogeneities obtained for control cells was very low, thus implying that when the cube lattices were deformed in different ways there was no polarization independency.

The invention claimed is:

1. A process for making an optical component comprising a liquid crystal material stabilized in a blue phase, the process comprising:
   a) providing a first layer and a second layer, the first and second layers forming two main surfaces facing each other, at least one of the main surfaces having an alignment layer toward the other main surface, said alignment layer comprising polyimide;
   b) filling up the space between said first and second layer with a composition comprising a mix of said liquid crystal material, a chiral dopant, and a matrix material distinct from the liquid crystal material, said liquid crystal material comprising liquid crystal molecules adapted to organize relative to each other to form a blue phase and said matrix material comprising monomers adapted to polymerize;
   c) bringing the liquid crystal material into said blue phase by inducing the liquid crystal molecules to form blue phase structures; and
   d) polymerizing the monomers of the matrix material while the liquid crystal material is in said blue phase, the polymerization step d) being achieved at a polymerization temperature at which the liquid crystal material exhibits at least a first predetermined minimal proportion of a first type of structure called blue phase I and at least a second predetermined minimal proportion of a second type of structure called blue phase II, the first predetermined minimal proportion being obtained when the blue phase I covers at least 40% of a surface of composition having the liquid crystal in a blue phase, in a plane parallel to said first and second layers, and the second predetermined minimal proportion being obtained when blue phase II covers at least 20% of said surface.

2. The process according to claim 1, in which the polymerization temperature is reached by:
   m) increasing the temperature of the liquid crystal material until all the liquid crystal molecules are organized relative to each other to form mostly the second type of structure called blue phase II; and n) slowly lowering the temperature of the liquid crystal material until the blue phase I first type of structure represents said first predetermined minimal proportion of the liquid crystal material.

3. The process according to claim 2, according to which, in the lowering n), one of the actual proportion of the liquid crystal material in blue phase I, the orientation of the blue phase I, the alignment of the blue phase I and the proportion of the blue phase I, is determined using a Kossel pattern.

4. The process according to claim 2, according to which the increasing m) and the lowering n) are preceded by at least one cycle of raising the temperature until the liquid crystal material in blue phase is only in the blue phase II type of structure and then lowering the temperature until the liquid crystal material in blue phase is only in the blue phase I type of structure.

5. The process according to claim 1, according to which the polymerizing d) consists in an UV-irradiation of the composition achieved with a light beam of power rate ranging from 0.1 mW/cm$^2$ to 1 mW/cm$^2$, for a duration ranging from 5 minutes to 2 hours.

6. The process according to claim 1, wherein in the filling b), the liquid crystal material comprising guest liquid crystal molecules, said composition comprises in weight relative to the total weight of said liquid crystal material from 30% to 55% of said guest liquid crystal molecules.

7. The process according to claim 1, according to which in the providing a), each alignment layer is formed by a rubbed polyimide layer.

8. The process according to claim 7, wherein the guest liquid crystal molecules are CB5 liquid crystal molecules, wherein CB5 is as follows:

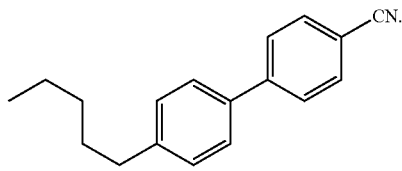 [SMILES: CCCCCc1ccc(-c2ccc(C#N)cc2)cc1]

* * * * *